US012771738B2

(12) United States Patent
Nakajima

(10) Patent No.: US 12,771,738 B2
(45) Date of Patent: Oct. 20, 2026

(54) CONNECTION REQUEST FORWARDING SYSTEM THAT FORWARDS CONNECTION REQUEST FROM CONNECTION SOURCE TO ONE OF PLURALITY OF INFORMATION PROCESSING SYSTEMS, AND COMPUTER-READABLE, NON-TRANSITORY RECORDING MEDIUM HAVING CONNECTION REQUEST FORWARDING PROGRAM STORED THEREIN

(71) Applicant: KYOCERA Document Solutions Inc., Osaka (JP)

(72) Inventor: Koki Nakajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 36 days.

(21) Appl. No.: 18/924,113

(22) Filed: Oct. 23, 2024

(65) Prior Publication Data

US 2025/0141951 A1 May 1, 2025

(30) Foreign Application Priority Data

Oct. 25, 2023 (JP) ................................ 2023-183325
Oct. 25, 2023 (JP) ................................ 2023-183327
Oct. 25, 2023 (JP) ................................ 2023-183329

(51) Int. Cl.
*H04L 67/02* (2022.01)
*H04L 67/52* (2022.01)

(52) U.S. Cl.
CPC .............. *H04L 67/02* (2013.01); *H04L 67/52* (2022.05)

(58) Field of Classification Search
CPC ................................ H04L 67/02; H04L 67/52
See application file for complete search history.

(56) References Cited

U.S. PATENT DOCUMENTS 7,873,734 B1 * 1/2011 Eidelman .............. H04L 67/142 709/227
2004/0044622 A1 * 3/2004 Blott .................... G06Q 20/102 705/40

(Continued)

FOREIGN PATENT DOCUMENTS

JP 6161803 B2 7/2017
JP 2019139691 A 8/2019
JP 7111912 B2 8/2022

*Primary Examiner* — Emmanuel L Moise
*Assistant Examiner* — Xiang Yu
(74) *Attorney, Agent, or Firm* — IP Business Solutions, LLC.

(57) ABSTRACT

A connection request forwarding system includes a communication device and a control device. The communication device performs communication between a connection source and a plurality of information processing systems. The control device includes a processor, and acts as a connection request forwarding device, when the processor executes a connection request forwarding program. The connection request forwarding device receives a connection request transmitted from the connection source, and forwards the connection request to one of the plurality of information processing systems. When a forwarding condition of the connection request is satisfied, at least on a basis of an HTTP request of the connection request, the connection request forwarding device forwards the connection request to the information processing system associated with the forwarding condition.

11 Claims, 23 Drawing Sheets

(56) References Cited

U.S. PATENT DOCUMENTS

| | | | |
|---|---|---|---|
| 2006/0112174 | A1 | 5/2006 | Heureux et al. |
| 2014/0366119 | A1 | 12/2014 | Floyd, III |
| 2019/0253524 | A1 | 8/2019 | Hoshizuki |
| 2020/0374239 | A1 | 11/2020 | Momchilov |
| 2021/0273987 | A1 | 9/2021 | You et al. |

* cited by examiner

Fig.4

41

| ID | FORWARDING CONDITION (JSON) | FORWARDING DESTINATION (JSON) |
|---|---|---|
| 001 | {"match":"exactly","url":"/eu/000-111-222/DM/","url action":"non"} | {"url":"https://companyA.example.com"} |
| 002 | {"match":"partial","url":"/eu/","url action":"edit","/"} | {"url":"https://eu.example.com"} |
| 003 | {"match":"partial","url":"/us/","url action":"edit","/"} | {"url":"https://us.example.com"} |
| 004 | {"match":"partial","url":"/000-111-333/","url action":"non"} | {"url":"https://companyB.example.com"} |
| 005 | {"match":"partial","url":"/auth/","url action":"non"} | {"url":"https://auth.example.com"} |
| 006 | {} | {"url":"https://as.example.com"} |

Fig.8

41

| ID | FORWARDING CONDITION (JSON) | FORWARDING DESTINATION (JSON) |
|---|---|---|
| 001 | {"match":"partial","url":"/eu/","url action":"edit","/"} | {"url":"https://eu.example.com"} |
| 002 | {"match":"partial","url":"/us/","url action":"edit","/"} | {"url":"https://us.example.com"} |
| 003 | {} | {"url":"https://as.example.com"} |

Fig.10

42

| ID | FORWARDING CONDITION (JSON) | FORWARDING DESTINATION (JSON) |
|---|---|---|
| 001 | {"match":"partial","url":"/eu/","url action":"edit","/"} | {"url":"https://eu.example.com"} |
| 002 | {"match":"partial","url":"/us/","url action":"edit","/"} | {"url":"https://us.example.com"} |
| 003 | {"match":"exactly","tenant-id":"000-111-333","url action":"non"} | {"url":"https://companyA.example.com"} |
| 004 | {"match":"partial","function":"auth","url action":"non"} | {"url":"https://auth.example.com"} |
| 005 | {} | {"url":"https://as.example.com"} |

Fig.15

42

| ID | FORWARDING CONDITION (JSON) | FORWARDING DESTINATION (JSON) |
|---|---|---|
| 001 | {"match":"partial","url":"/eu/","url action":"edit","/"} | {"url":"https://eu.example.com"} |
| 002 | {"match":"partial","url":"/us/","url action":"edit","/"} | {"url":"https://us.example.com"} |
| 003 | {"match":"partial","url":"/000-111-333/","url action":"non"} | {"url":"https://companyA.example.com"} |
| 004 | {"match":"partial","function":"auth","url action":"non"} | {"url":"https://auth.example.com"} |
| 005 | {} | {"url":"https://as.example.com"} |

Fig.17

43

| ID | FORWARDING CONDITION (JSON) |
|---|---|
| 001 | {"match":"partial","url":"/eu/","url action":"edit","/"} |
| 002 | {"match":"partial","url":"/us/","url action":"edit","/"} |
| 003 | {"match":"exactly","tenant-id":"000-111-333","url action":"non"} |
| 004 | {"match":"partial","function":"auth","url action":"non"} |
| 005 | {} |

| FORWARDING DESTINATION (JSON) | PROHIBITION CONDITION |
|---|---|
| {"url":"https://eu.example.com"} | IP ADDRESS OF CONNECTION SOURCE IS ONE OF 192.0.2.0 TO 192.0.2.10, AND TENANT ID IS 000-111-333 OR 000-111-444. |
| {"url":"https://us.example.com"} | IP ADDRESS OF CONNECTION SOURCE IS ONE OF 192.0.2.20 TO 192.0.2.30, OR USER ID IS U0001 OR U0002 |
| {"url":"https://companyA.example.com"} | USER ID IS U0003 |
| {"url":"https://auth.example.com"} | IP ADDRESS OF CONNECTION SOURCE IS 192.0.2.40, OR TENANT ID IS 000-111-555 |
| {"url":"https://as.example.com"} | NONE |

Fig.23

43

| ID | FORWARDING CONDITION (JSON) | FORWARDING DESTINATION (JSON) | PROHIBITION CONDITION |
|---|---|---|---|
| 001 | {"match":"partial","url":"/eu/","url action":"edit","/"} | {"url":"https://eu.example.com"} | IP ADDRESS OF CONNECTION SOURCE IS ONE OF 192.0.2.0 TO 192.0.2.10, AND TENANT ID IS 000-111-333 OR 000-111-444. |
| 002 | {"match":"partial","url":"/us/","url action":"edit","/"} | {"url":"https://us.example.com"} | IP ADDRESS OF CONNECTION SOURCE IS ONE OF 192.0.2.20 TO 192.0.2.30, OR USER ID IS U0001 OR U0002 |
| 003 | {"match":"partial","url":"/000-111-333/","url action":"non"} | {"url":"https://companyA.example.com"} | USER ID IS U0003 |
| 004 | {"match":"partial","function":"auth","url action":"non"} | {"url":"https://auth.example.com"} | IP ADDRESS OF CONNECTION SOURCE IS 192.0.2.40, OR TENANT ID IS 000-111-555 |
| 005 | {} | {"url":"https://as.example.com"} | NONE |

CONNECTION REQUEST FORWARDING SYSTEM THAT FORWARDS CONNECTION REQUEST FROM CONNECTION SOURCE TO ONE OF PLURALITY OF INFORMATION PROCESSING SYSTEMS, AND COMPUTER-READABLE, NON-TRANSITORY RECORDING MEDIUM HAVING CONNECTION REQUEST FORWARDING PROGRAM STORED THEREIN

INCORPORATION BY REFERENCE

This application claims priority to Japanese Patent Application No. 2023-183325 filed on Oct. 25, 2023, Japanese Patent Application No. 2023-183327 filed on Oct. 25, 2023, and Japanese Patent Application No. 2023-183329 filed on Oct. 25, 2023, the entire contents of which are incorporated by reference herein.

BACKGROUND

The present disclosure relates to a connection request forwarding system that forwards a connection request from a connection source, to one of a plurality of information processing systems, and a computer-readable, non-transitory recording medium, having a connection request forwarding program stored therein.

A technique to make access to an information processing system from an external connection source, thereby utilizing a function provided by the information processing system, is generally known.

SUMMARY

The disclosure proposes further improvement of the foregoing technique.

In an aspect, the disclosure provides a connection request forwarding system, including a communication device and a control device. The communication device performs communication between a connection source and a plurality of information processing systems. The control device includes a processor, and acts as a connection request forwarding device, when the processor executes a connection request forwarding program. The connection request forwarding device receives a connection request transmitted from the connection source, and forwards the connection request to one of the plurality of information processing systems. When a forwarding condition of the connection request is satisfied, at least on a basis of an HTTP request of the connection request, the connection request forwarding device forwards the connection request to the information processing system associated with the forwarding condition.

In another aspect, the disclosure provides a computer-readable, non-transitory recording medium having a connection request forwarding program stored therein. The connection request forwarding program is configured to cause a computer to act as a connection request forwarding device, when a processor included in the computer executes the connection request forwarding program. The connection request forwarding device receives a connection request transmitted from the connection source, and forwards the connection request to one of a plurality of information processing systems. When a forwarding condition of the connection request is satisfied, at least on a basis of an HTTP request of the connection request, the connection request forwarding device forwards the connection request to the information processing system associated with the forwarding condition.

BRIEF DESCRIPTION OF THE DRAWINGS

FIG. 4 is a table showing an example of a forwarding rule;

FIG. 8 is a schematic drawing showing another example of the forwarding rule;

FIG. 10 is a schematic drawing showing another example of the forwarding rule;

FIG. 15 is a schematic drawing showing another example of the forwarding rule;

FIG. 17 is a schematic drawing showing another example of the forwarding rule;

FIG. 23 is a schematic drawing showing another example of the forwarding rule.

DETAILED DESCRIPTION

Hereafter, some embodiments of the disclosure will be described, with reference to the drawings.

First Embodiment

To start with, a configuration of a system according to a first embodiment will be described.

Figure 1:
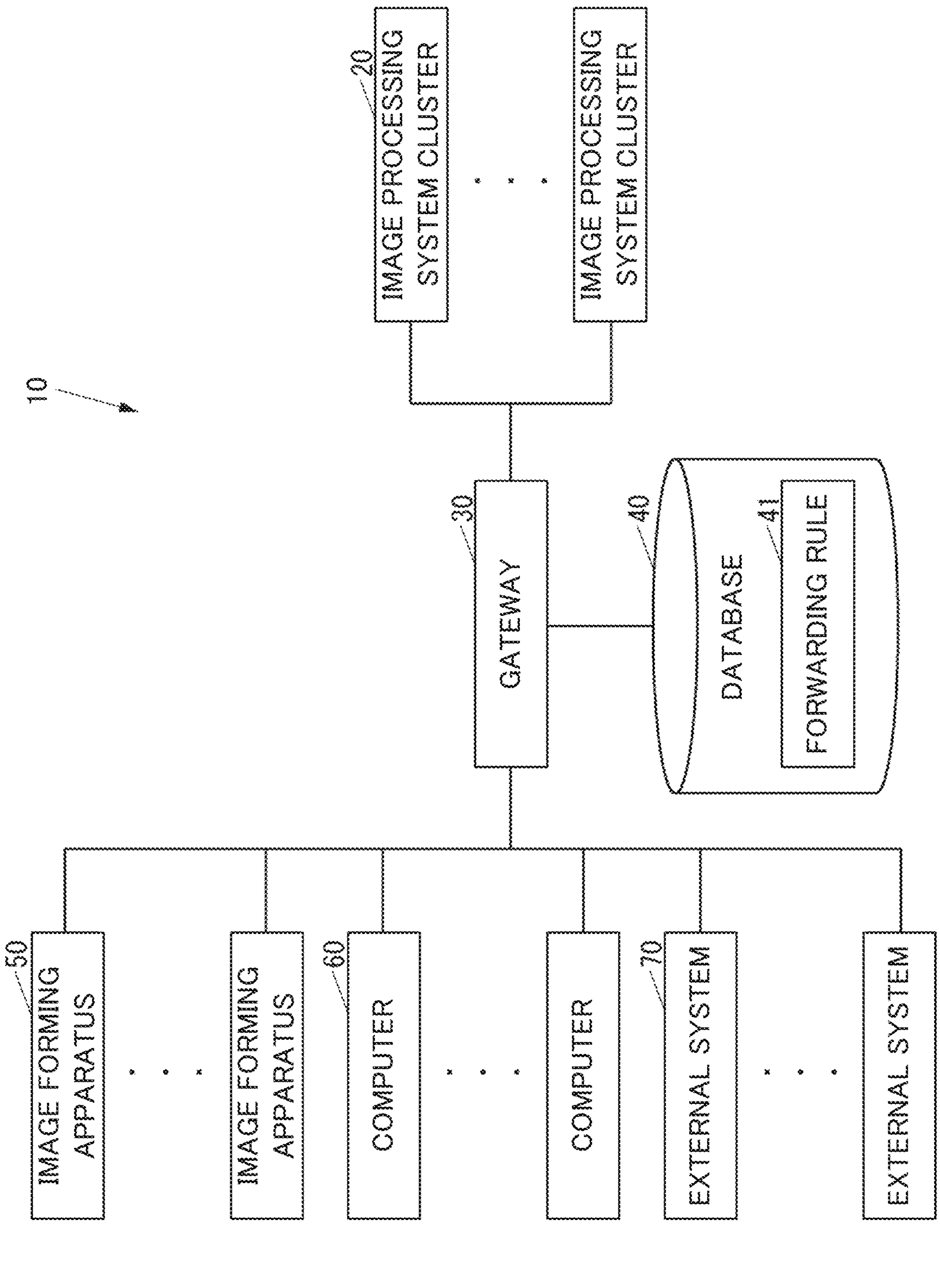
FIG. 1 is a block diagram showing a system.

FIG. 1 is a block diagram showing the system 10 according to the first embodiment.

As shown in FIG. 1, the system 10 includes a plurality of image processing system clusters 20, each serving as an information processing system that executes document processing, including generating, searching, editing, or saving documents. The system 10 may include, in addition to the image processing system clusters 20, at least one image processing system cluster configured similarly to the image processing system cluster 20. The image processing system cluster 20 may be configured to act in a multitenant model utilized by a plurality of tenants. The image processing system cluster 20 may be composed of a single computer, such as a personal computer (PC), or a plurality of computers. The image processing system cluster 20 may be realized on a cloud service.

The image processing system cluster 20 may be installed in each of the regions, such as USA, Europe, and Asia. Installing the image processing system cluster 20 in each of the regions allows the system 10 to disperse the processing load to each of the regions, and to continue with the processing operation, for example when the image processing system cluster 20 in one of the regions has failed, using the image processing system cluster 20 of another region.

The image processing system cluster 20 may be provided for each of the functions, with respect to at least a part of the functions including, for example, a user authentication function, a tenant management function for managing the tenant, and a device management function for managing an image forming apparatus 50 to be subsequently described. Providing the image processing system cluster 20 for each of the functions enables the system 10 to assign a single image processing system cluster 20 in the whole world, for a specific function, thereby reducing the cost.

The image processing system cluster 20 may be provided for each of the tenants, with respect to at least a part of the tenants. Providing the image processing system cluster 20 for each of the tenants enables the system 10 to, for example, disperse the processing load to each of the tenants, and improve the security level.

The system 10 includes a gateway 30, that relays a session to one of the image processing system clusters 20 located on the back end, according to a request from the image forming apparatus 50, a computer 60, or an external system 70, to be subsequently described. The gateway 30 may be composed of a single computer, such as a PC, or a plurality of computers. The gateway 30 may be realized on a cloud service. The system 10 includes a database 40, containing a forwarding rule 41 for forwarding the connection request from the image forming apparatus 50, the computer 60, or the external system 70, acting as the connection source, to one of the plurality of image processing system clusters 20.

The system 10 includes the image forming apparatus 50, configured to transmit and receive a document to and from the image processing system cluster 20, and to print a document. The system 10 may include, in addition to the image forming apparatus 50, at least another image forming apparatus configured similarly to the image forming apparatus 50.

The system 10 includes a computer 60, constituted of, for example, a mobile device such as a smartphone, or a PC. The system 10 may include, in addition to the computer 60, at least another computer configured similarly to the computer 60. The computer 60 can utilize the image processing system cluster 20, via an application such as a web browser or a native application. The computer 60 can, for example, cause the image processing system cluster 20 to save a document, search the documents managed by the image processing system cluster 20, look up the document managed by the image processing system cluster 20, or edit the document managed by the image processing system cluster 20.

The system 10 includes an external system 70, that utilizes the image processing system cluster 20, from outside of the image processing system cluster 20. The system 10 may include, in addition to the external system 70, at least another external system configured similarly to the external system 70. The external system 70 may be set up on a cloud service.

Figure 2:
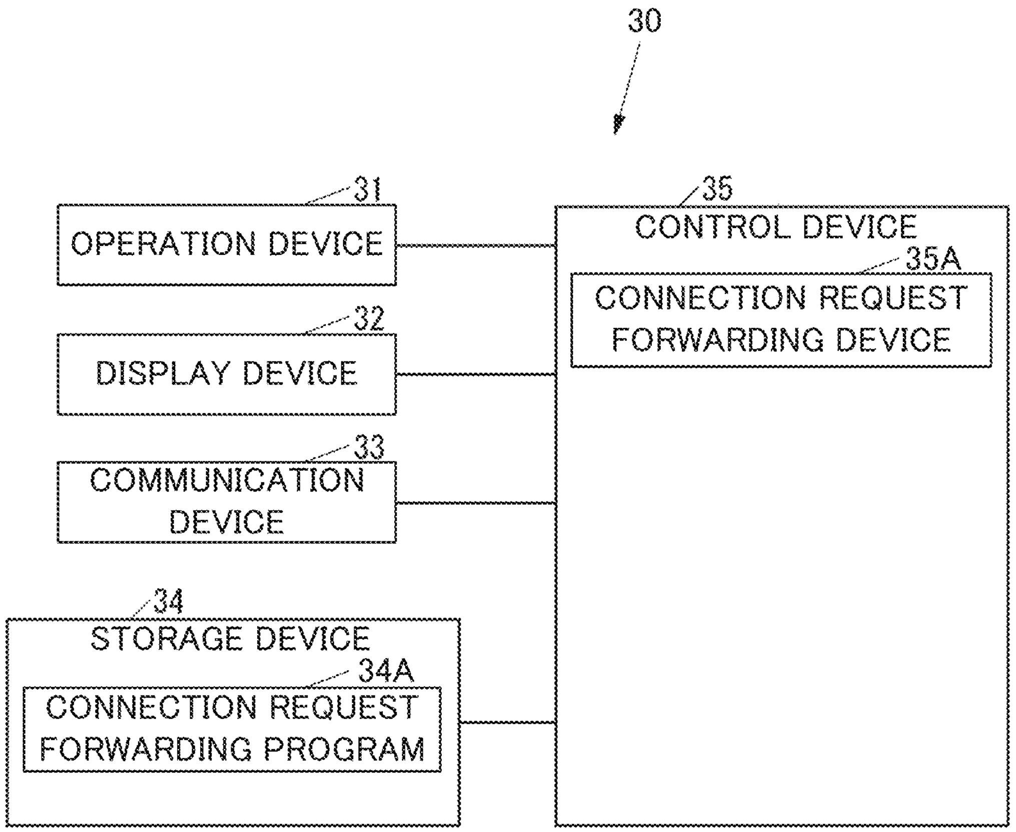
FIG. 2 is a block diagram showing an example of a gateway.

FIG. 2 is a block diagram showing a configuration of the gateway 30, constituted of a single computer.

As shown in FIG. 2, the gateway 30 includes an operation device 31 including, for example, a keyboard and a mouse for inputting various operations, a display device 32, for example including a liquid crystal display (LCD) for displaying various types of information, a communication device 33 that performs communication with an external device, via a network such as a LAN or the internet, or directly through wired or wireless communication, a storage device 34 including a non-volatile memory unit such as a semiconductor memory or a hard disk drive (HDD), for storing various types of information, and a control device 35 that controls the overall operation of the gateway 30.

The storage device 34 contains a connection request forwarding program 34A, for forwarding the connection request from the connection source to one of the plurality of image processing system clusters 20. The connection request forwarding program 34A may be, for example, installed in the gateway 30 during the manufacturing process thereof, additionally installed in the gateway 30 from an external storage medium such as a universal serial bus (USB) memory, or additionally installed in the gateway 30 from the network.

The control device 35 includes, for example, a central processing unit (CPU), a read-only memory (ROM) containing programs and various types of data, and a random-access memory (RAM) serving as the operation region for the CPU of the control device 35. The CPU of the control device 35 executes the program stored in the storage device 34 or the ROM of the control device 35.

The control device 35 acts, by executing the connection request forwarding program 34A, as a connection request forwarding device 35A that forwards the connection request from the connection source, to one of the plurality of image processing system clusters 20. Therefore, the gateway 30 constitutes a part of the connection request forwarding system according to the disclosure.

Figure 3A:
FIG. 3A is a schematic drawing showing an example of a preliminary URL.
Figure 3B:
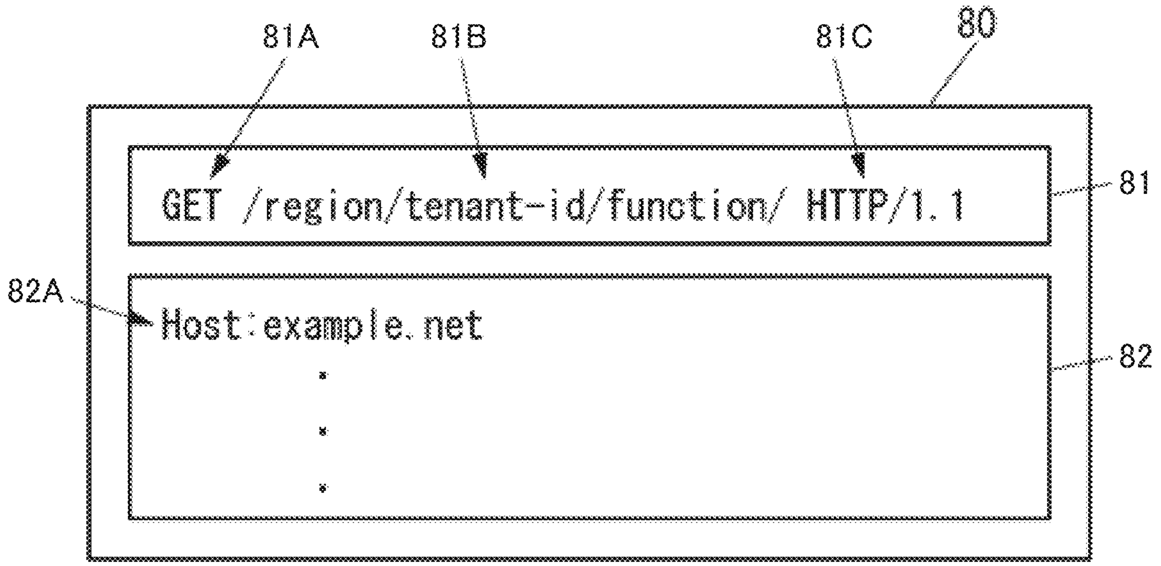
FIG. 3B is a schematic drawing showing an example of an HTTP request of a connection request, transmitted to the preliminary URL.

FIG. 3A illustrates an example of a uniform resource locator (URL) of a transmission destination of the connection request transmitted from the connection source. FIG. 3B illustrates an example of a hypertext forward protocol (HTTP) request 80 of the connection request, transmitted to the URL shown in FIG. 3A.

The connection source such as the image forming apparatus 50, the computer 60, or the external system 70 shown in FIG. 1, transmits the connection request to a specific URL (hereinafter, "preliminary URL"), to make connection to the image processing system cluster 20.

The preliminary URL has, for example, a format of "https://example.net/region/tenant-id/function/" as shown in FIG. 3A.

The "example.net", representing the domain name in the preliminary URL shown in FIG. 3A, indicates the domain name of the gateway 30. In the section of "region" in the path in the preliminary URL, actually a specific character string indicating the region is written, such as "us" indicating the USA, "eu" indicating Europe, or "as" indicating Asia. In the section of "tenant-id" in the path in the preliminary URL, actually a specific character string indicating a tenant ID such as "000-111-333", serving as the identification information of the tenant, is written. In the section of "function" in the path in the preliminary URL, actually a specific character string indicating the function of the image processing system cluster 20 is written, such as "auth" indicating the authentication function, "TM" indicating the tenant management function, or "DM" indicating the device management function.

The HTTP request 80 of the connection request transmitted from the connection source to the preliminary URL shown in FIG. 3A has, for example, a structure shown in FIG. 3B.

The HTTP request 80 shown in FIG. 3B includes a request line 81 constituting the first line, and a header field 82 located immediately after the request line 81, and which may be constituted of a plurality of lines. The HTTP request 80 may also include a message main body, located immediately after a blank line provided right under the header field 82. The message main body may also be constituted of a plurality of lines.

The request line 81 includes a method 81A designating the type of the request, a target 81B of the request, located immediately after the method 81A via a space, and a version 81C of the HTTP located immediately after the target 81B via a space. Although the method 81A is specified as "GET" in the example shown in FIG. 3B, a method other than "GET" may be applied.

The target 81B corresponds to "/region/tenant-id/function/", which is the path in the preliminary URL shown in FIG. 3A.

The header field 82 includes a header in each of the lines, in the format of "field name: value". For example, the header field 82 includes a Host header 82A for designating the domain name of the server to be connected to. The Host header 82A shown in FIG. 3B is "Host: example.net", indicating the domain name in the preliminary URL shown in FIG. 3A.

FIG. 4 is a table showing the forwarding rule 41.

The forwarding rule 41 shown in FIG. 4 includes forwarding conditions of the connection request, and the ID serving as the identification information of each forwarding condition and the forwarding destination associated with the forwarding condition, which are specified with respect to each of the forwarding conditions.

The forwarding condition is applied with higher priority, the smaller the numerical value of the ID is. The forwarding condition corresponding to the ID "001" in the forwarding rule 41 is that the path included in the request line 81 of the HTTP request 80 completely accords with a character string "/eu/000-111-222/". The forwarding condition corresponding to the ID "002" in the forwarding rule 41 is that the path included in the request line 81 of the HTTP request 80 includes a character string "/eu/". The forwarding condition corresponding to the ID "003" in the forwarding rule 41 is that the path included in the request line 81 of the HTTP request 80 includes a character string "/us/". The forwarding condition corresponding to the ID "004" in the forwarding rule 41 is that the path included in the request line 81 of the HTTP request 80 includes a character string "/000-111-333/". The forwarding condition corresponding to the ID "005" in the forwarding rule 41 is that the path included in the request line 81 of the HTTP request 80 includes a character string "/auth/". The forwarding condition corresponding to the ID "006" in the forwarding rule 41 is that the path included in the request line 81 of the HTTP request 80 may include any character string.

There may be cases where the forwarding condition is associated with an instruction to edit the path included in the request line 81 of the HTTP request 80, in the forwarding rule 41. The forwarding conditions corresponding to the ID "001", "004", and "005" in the forwarding rule 41 each include a character string "url action": "non", which indicates that the instruction to edit the path is not associated with the forwarding condition. The forwarding condition corresponding to the ID "002" in the forwarding rule 41 includes a character string "url action": "edit", "/", which indicates that the editing instruction, to substitute the character string "/eu/" in the path included in the request line 81 of the HTTP request 80 with the character string "/", is associated with the forwarding condition. The forwarding condition corresponding to the ID "003" in the forwarding rule 41 includes a character string "url action": "edit", "/", which indicates that the editing instruction, to substitute the character string "/us/" in the path included in the request line 81 of the HTTP request 80 with the character string "/", is associated with the forwarding condition. The character string to be substituted may include a regular expression.

The forwarding destination in the forwarding rule 41 indicates the portion of the URL of the forwarding destination of the connection request, other than the path. The character string "companyA.example.com" in the forwarding destination associated with the forwarding condition corresponding to the ID "001" in the forwarding rule 41 indicates, for example, the domain name of the image processing system cluster 20 located in Europe, and to be used for the device management function for the tenant having the tenant ID "000-111-222". The character string "eu.example.com" in the forwarding destination associated with the forwarding condition corresponding to the ID "002" in the forwarding rule 41 indicates, for example, the domain name of the image processing system cluster 20 located in Europe. The character string "us.example.com" in the forwarding destination associated with the forwarding condition corresponding to the ID "003" in the forwarding rule 41 indicates, for example, the domain name of the image processing system cluster 20 located in the USA. The character string "companyB.example.com" in the forwarding destination associated with the forwarding condition corresponding to the ID "004" in the forwarding rule 41 indicates, for example, the domain name of the image processing system cluster 20 for the tenant having the tenant ID "000-111-333". The character string "auth.example.com" in the forwarding destination associated with the forwarding condition corresponding to the ID "005" in the forwarding rule 41 indicates, for example, the domain name of the image processing system cluster 20 to be used for the authentication function. The character string "as.example-.com" in the forwarding destination associated with the forwarding condition corresponding to the ID "006" in the forwarding rule 41 indicates, for example, the domain name of the image processing system cluster 20 located in Asia.

The forwarding condition corresponding to the ID "006" in the forwarding rule 41 is, as described above, that the path included in the request line 81 of the HTTP request 80 may include any character string. Therefore, the forwarding destination associated with the forwarding condition corresponding to the ID "006" in the forwarding rule 41 is a standard forwarding destination, identified when none of the other forwarding conditions are satisfied. Here, it is not mandatory that the forwarding rule 41 includes the standard forwarding destination.

Hereunder, the operation of the gateway 30, performed upon receipt of the connection request from the image forming apparatus 50, the computer 60, or the external system 70, will be described.

Although the following description refers to the case where the gateway 30 has received the connection request from the image forming apparatus 50, the gateway 30 performs similarly upon receipt of the connection request from an image forming apparatus other than the image forming apparatus 50, or from the computer 60 or the external system 70.

As described above, the image forming apparatus 50 transmits the connection request to the preliminary URL, to make connection to the image processing system cluster 20. The following description refers to the case where the preliminary URL is "https://example.net/region/tenant-id/function/", as shown in FIG. 3A.

Figure 5:
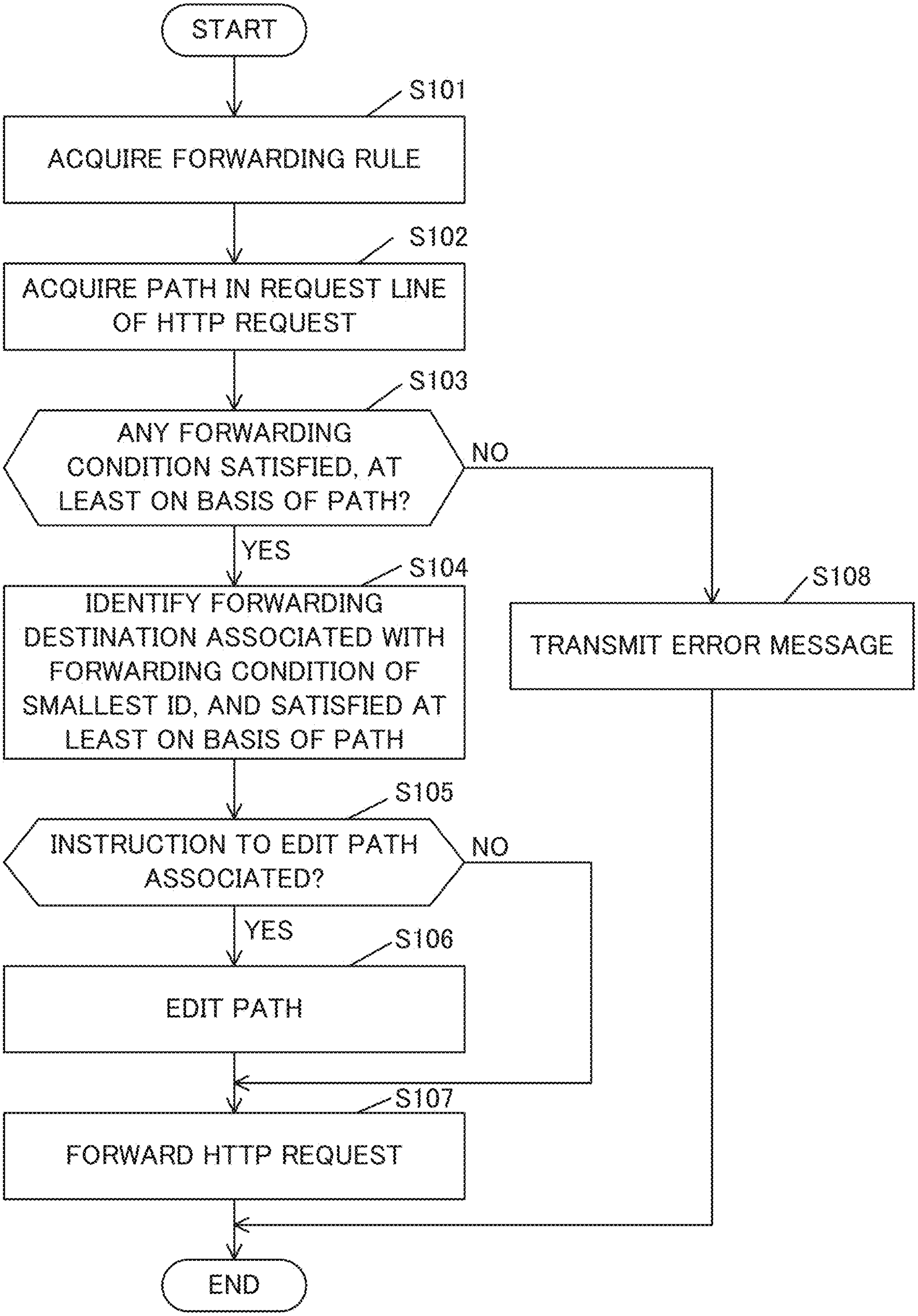
FIG. 5 is a flowchart showing an example of an operation performed by the gateway that has received the connection request.

FIG. 5 is a flowchart showing the operation performed by the gateway 30, upon receipt of the connection request from the image forming apparatus 50.

The connection request forwarding device 35A of the gateway 30 performs, upon receipt of the connection request from the image forming apparatus 50, the operation specified in FIG. 5.

As shown in FIG. 5, the connection request forwarding device 35A acquires the forwarding rule 41, from the database 40 (step S101).

After step S101, the connection request forwarding device 35A acquires the path included in the request line 81 of the HTTP request 80 of the connection request received from the image forming apparatus 50 (step S102). In other words, the connection request forwarding device 35A acquires the path included in the preliminary URL.

After step S102, the connection request forwarding device 35A decides whether the forwarding conditions in the forwarding rule 41 acquired as above include the forwarding condition that is satisfied at least on the basis of the acquired path (step S103).

Upon deciding at step S103 that the forwarding conditions in the forwarding rule 41 acquired as above include the forwarding condition that is satisfied at least on the basis of the acquired path, the connection request forwarding device 35A identifies the forwarding destination associated with the forwarding condition in the forwarding rule 41, satisfied at least on the basis of the acquired path, and corresponding to the smallest ID, out of the forwarding conditions in the acquired forwarding rule 41 (hereinafter, "applicable forwarding condition") (step S104).

After step S104, the connection request forwarding device 35A decides whether the instruction to edit the path is associated with the applicable forwarding condition, in the forwarding rule 41 (step S105).

Upon deciding at step S105 that the instruction to edit the path is associated with the applicable forwarding condition in the forwarding rule 41, the connection request forwarding device 35A edits the path included in the request line 81 of the HTTP request 80, according to the editing instruction associated with the applicable forwarding condition (step S106). For example, when the forwarding rule 41 acquired at step S101 is specified as shown in FIG. 4, and the request line 81 of the HTTP request 80 is written as "GET/eu/000-111-222/TM/HTTP/1.1", the forwarding condition having the ID "002" corresponds to the applicable forwarding condition. Therefore, the connection request forwarding device 35A edits the request line 81 of the HTTP request 80 as "GET/000-111-222/TM/HTTP/1.1", at step S106.

Upon deciding at step S105 that the instruction to edit the path is not associated with the applicable forwarding condition in the forwarding rule 41, or upon finishing the operation of step S106, the connection request forwarding device 35A forwards the HTTP request 80 to the image processing system cluster 20, corresponding to the forwarding destination identified at step S104 (step S107), and finishes the operation shown in FIG. 5.

In contrast, upon deciding at step S103 that the forwarding conditions in the acquired forwarding rule 41 do not include the forwarding condition that is satisfied at least on the basis of the acquired path, the connection request forwarding device 35A connection request forwarding device 35A transmits an error message such as "404 not found", to the image forming apparatus 50 that is the connection source (step S108), and finishes the operation shown in FIG. 5.

Figure 6A:
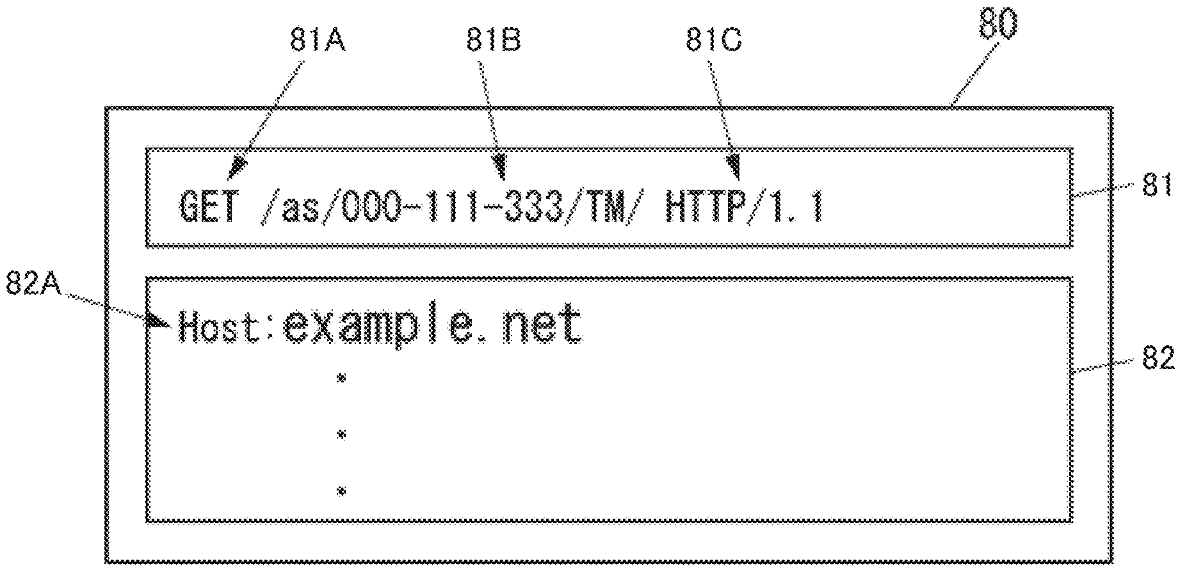
FIG. 6A is a schematic drawing showing another example of the HTTP request of the connection request, transmitted to the preliminary URL.
Figure 6B:
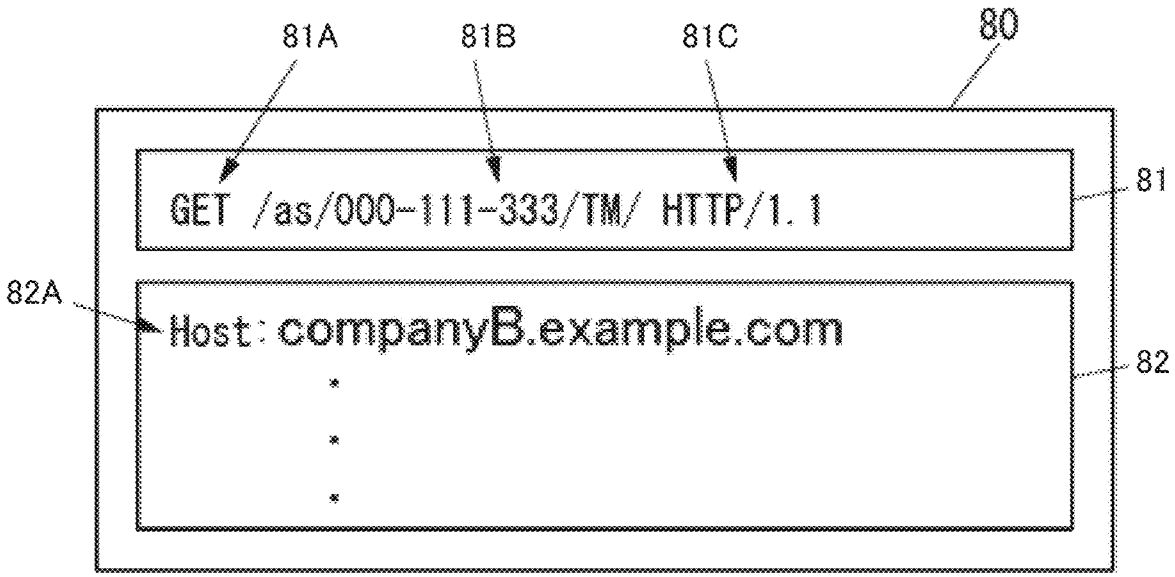
FIG. 6B is a schematic drawing showing an example of the HTTP request, transmitted to an image processing system cluster.

FIG. 6A illustrates the HTTP request 80 of the connection request transmitted to the preliminary URL, different from the one shown in FIG. 3B. FIG. 6B illustrates an example of the HTTP request 80, forwarded by the connection request forwarding device 35A that has received the HTTP request 80 shown in FIG. 6A, to the image processing system cluster 20.

When the connection request forwarding device 35A receives the HTTP request 80 shown in FIG. 6A, with the forwarding rule 41 being specified as shown in FIG. 4, the forwarding condition corresponding to the ID "004" is satisfied, at least on the basis of the path included in the request line 81 of the HTTP request 80 (YES at step S103), and the instruction to edit the path is not associated with the forwarding condition corresponding to the ID "004" in the forwarding rule 41 (NO at step S105). Therefore, the connection request forwarding device 35A rewrites the Host header 82A of the HTTP request 80 from "Host: example.net" (see FIG. 6A) to "Host: companyB.example.com" (see FIG. 6B), indicating the domain name of the forwarding destination associated with the forwarding condition corresponding to the ID "004", and forwards the HTTP request 80 shown in FIG. 6B (step S107).

Figure 7A:
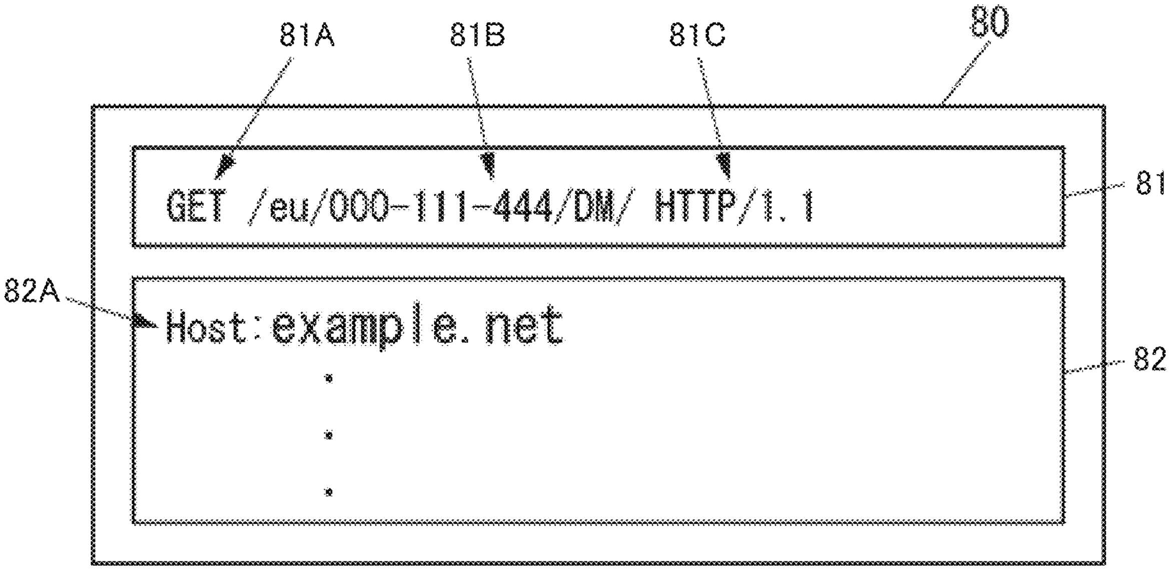
FIG. 7A is a schematic drawing showing another example of the HTTP request of the connection request, transmitted to the preliminary URL.
Figure 7B:
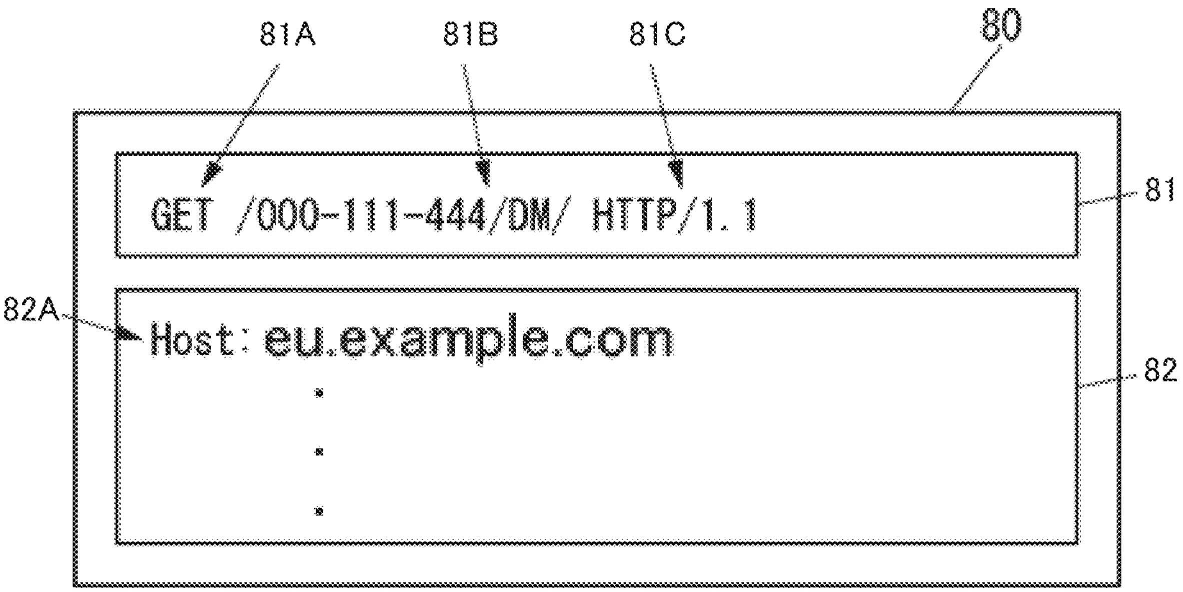
FIG. 7B is a schematic drawing showing another example of the HTTP request, transmitted to the image processing system cluster.

FIG. 7A illustrates the HTTP request 80 of the connection request, transmitted to the preliminary URL, different from the one shown in FIG. 3B and FIG. 6A. FIG. 7B illustrates an example of the HTTP request 80, forwarded by the connection request forwarding device 35A that has received the HTTP request 80 shown in FIG. 7A, to the image processing system cluster 20.

When the connection request forwarding device 35A receives the HTTP request 80 shown in FIG. 7A, with the forwarding rule 41 being specified as shown in FIG. 4, the forwarding condition corresponding to the ID "002" is satisfied, at least on the basis of the path included in the request line 81 of the HTTP request 80 (YES at step S103), and the instruction to edit the path is associated with the forwarding condition corresponding to the ID "002" in the forwarding rule 41 (YES at step S105). Therefore, the connection request forwarding device 35A rewrites the Host header 82A of the HTTP request 80 from "Host: example.net" (see FIG. 7A) to "Host: eu.example.com" (see FIG. 7B), indicating the domain name of the forwarding destination associated with the forwarding condition corresponding to the ID "002", and deletes "/eu" from the path included in the target 81B of the request line 81 of the HTTP request 80, as shown in FIG. 7B (step S106), and then forwards the HTTP request 80 shown in FIG. 7B (step S107)

Now, in the case of the aforementioned existing technique, related to a plurality of information processing systems, and a connection request forwarding system that forwards the connection request from the connection source to one of the plurality of information processing systems, the connection request from the connection source is unable to be forwarded to the appropriate one of the plurality of information processing systems, according to the detail of the connection request.

According to the first embodiment, in contrast, the gateway 30 forwards the connection request, to the image processing system cluster 20 corresponding to the forwarding destination, associated in the forwarding rule 41 with the forwarding condition that is satisfied at least on the basis of the HTTP request 80 of the connection request from the connection source (step S101 to step S104, and step S107). Therefore, the connection request from the connection source can be forwarded to the appropriate one of the plurality of image processing system clusters 20, according to the detail of the connection request.

According to the first embodiment, the gateway 30 forwards the connection request, to the image processing system cluster 20 corresponding to the forwarding destination, associated with the forwarding condition that is satisfied at least on the basis of the path included in the request line 81 of the HTTP request 80 of the connection request from the connection source, in the forwarding rule 41 (step S101 to step S104, and step S107). Therefore, the connection request from the connection source can be forwarded to the appropriate image processing system clusters 20, with a simple configuration.

According to the first embodiment, when the forwarding condition corresponding to one of the IDs "001" to "005" is satisfied, in other words when the path included in the request line 81 of the HTTP request 80 at least includes a specific character string, the gateway 30 forwards the connection request to the specific image processing system cluster 20. Therefore, the connection request from the connection source can be forwarded to the appropriate image processing system clusters 20, with a simple configuration.

According to the first embodiment, the forwarding condition including a condition that the path included in the request line 81 of the HTTP request 80 includes the character string indicating a specific region (forwarding condition corresponding to the ID "001", "002", or "003"), is associated, in the forwarding rule 41, with the forwarding destination, which is the image processing system cluster 20 located in the corresponding region. Therefore, when the path included in the request line 81 of the HTTP request 80 at least includes the character string indicating the specific region, the gateway 30 can forward the connection request, to the image processing system cluster 20 located in the corresponding region.

Here, the forwarding condition including the condition that the path included in the request line 81 of the HTTP request 80 includes the character string indicating the specific region, does not necessarily have to be associated with the forwarding destination, which is the image processing system cluster 20 located in the corresponding region, in the forwarding rule 41.

According to the first embodiment, in addition, the forwarding condition including a condition that the path included in the request line 81 of the HTTP request 80 includes the character string indicating a specific tenant using the image processing system cluster 20 (forwarding condition corresponding to the ID "001" or "004"), is associated, in the forwarding rule 41, with the forwarding destination, which is the image processing system cluster 20 assigned to this tenant. Therefore, when the path included in the request line 81 of the HTTP request 80 at least includes the character string indicating the specific tenant using the image processing system cluster 20, the gateway 30 can forward the connection request, to the image processing system cluster 20 assigned to the specific tenant.

Here, the forwarding condition including the condition that the path included in the request line 81 of the HTTP request 80 includes the character string indicating the specific tenant using the image processing system cluster 20, does not necessarily have to be associated with the forwarding destination, which is the image processing system cluster 20 assigned to the specific tenant, in the forwarding rule 41.

According to the first embodiment, further, the forwarding condition including a condition that the path included in the request line 81 of the HTTP request 80 includes the character string indicating a specific function of the image processing system cluster 20 (forwarding condition corresponding to the ID "001" or "005"), is associated, in the forwarding rule 41, with the forwarding destination, which is the image processing system cluster 20 to be used for this function. Therefore, when the path included in the request line 81 of the HTTP request 80 at least includes the character string indicating the specific function of the image processing system cluster 20, the gateway 30 can forward the connection request, to the image processing system cluster 20 to be used for the specific function.

Here, the forwarding condition including the condition that the path included in the request line 81 of the HTTP request 80 includes the character string indicating the specific function of the image processing system cluster 20, does not necessarily have to be associated with the forwarding destination, which is the image processing system cluster 20 to be used for the specific function, in the forwarding rule 41.

According to the first embodiment, further, when the instruction to edit the path included in the request line 81 of the HTTP request 80 of the connection request is associated with the forwarding condition satisfied in the forwarding rule 41 (YES at step S105), the gateway 30 edits the path according to the instruction (step S106), and forwards the connection request (step S107). Therefore, the configuration of the image processing system cluster 20, which is the forwarding destination of the connection request, can be modified so as to accord with the edited path.

For example, the instruction to edit the path associated, in the forwarding rule 41, with the forwarding condition corresponding to the ID "002" or "003" in the forwarding rule 41, is the instruction to delete the character string indicating the region. from the path. Therefore, when the forwarding condition corresponding to the ID "002" or "003" in the forwarding rule 41 is satisfied at least on the basis of the path, the plurality of image processing system clusters 20, to which the connection request is forwarded, may be configured to perform the same operation, irrespective of the region. In other words, the code of the application program for realizing those image processing system clusters 20 may be common to all the image processing system clusters 20.

The forwarding rule 41 includes the forwarding condition related to all of the region, the tenant ID, and the function (forwarding condition corresponding to the ID "001"), the forwarding condition only related to the region (forwarding condition corresponding to the ID "002" or "003"), the forwarding condition only related to the tenant ID (forwarding condition corresponding to the ID "004"), and the forwarding condition only related to the function (forwarding condition corresponding to the ID "005"). Instead, the forwarding rule 41 may include at least one of the forwarding condition only related to the region and the tenant ID, the forwarding condition only related to the region and the function, and the forwarding condition only related to the tenant ID and the function.

For example, the forwarding conditions only related to the region and the function can be exemplified by a condition that "the path included in the request line 81 of the HTTP request 80 includes a character string indicating a specific region", or that "the path included in the request line 81 of the HTTP request 80 includes a character string indicating a specific function of the image processing system cluster 20", or a condition that "the path included in the request line 81 of the HTTP request 80 includes a character string indicating a specific region, and the path includes a character string indicating a specific function of the image processing system cluster 20".

The forwarding rule 41 may be specified such that the forwarding condition related to both of the tenant ID and the function is applied with the highest priority, among the forwarding condition related to both of the tenant ID and the function, the forwarding condition only related to the tenant ID, and the forwarding condition only related to the function. Likewise, the forwarding rule 41 may be specified such that the forwarding condition only related to the tenant ID is applied with higher priority, among the forwarding condition only related to the function and the forwarding condition only related to the tenant ID.

The first embodiment refers to the case where the preliminary URL has the format of "https://example.net/region/tenant-id/function/". However, at least one of "region", "tenant-id", and "function" may be excluded from the preliminary URL. For example, the preliminary URL may be any of "https://example.net/region/tenant-id/", "https://example.net/region/function/", "https://example.net/tenant-id/function/", "https://example.net/region/", "https://example.net/tenant-id/", and "https://example.net/function/". When the preliminary URL has, for example, the format as "https://example.net/region/", the forwarding rule 41 may be specified as shown in FIG. 8.

In the first embodiment, the path included in the request line 81 of the HTTP request 80 includes the character string indicating the region, the character string indicating the tenant ID, and the character string indicating the function. However, the path included in the request line 81 of the HTTP request 80 may include a character string indicating a property other than the region, the tenant ID, and the function, instead of at least one of the character string indicating the region, the character string indicating the tenant ID, and the character string indicating the function, or in addition to the character string indicating the region, the character string indicating the tenant ID, and the character string indicating the function.

In the first embodiment, the forwarding condition is related to the path included in the request line 81 of the HTTP request 80. However, the forwarding condition may include a condition related to a portion of the HTTP request 80 other than the path included in the request line 81. For example, the forwarding condition may include a condition related to the value of a specific header in the header field 82 of the HTTP request 80.

Second Embodiment

Hereunder, a configuration of the system 10 according to a second embodiment will be described. Regarding the system 10 according to the second embodiment, the description of the same configuration as that of the first embodiment will not be repeated.

Figure 9A:
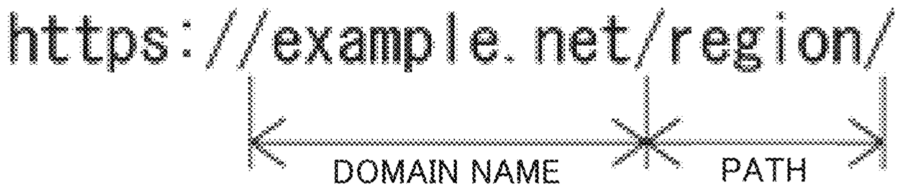
FIG. 9A is a schematic drawing showing another example of the URL to which the connection request is transmitted.
Figure 9B:
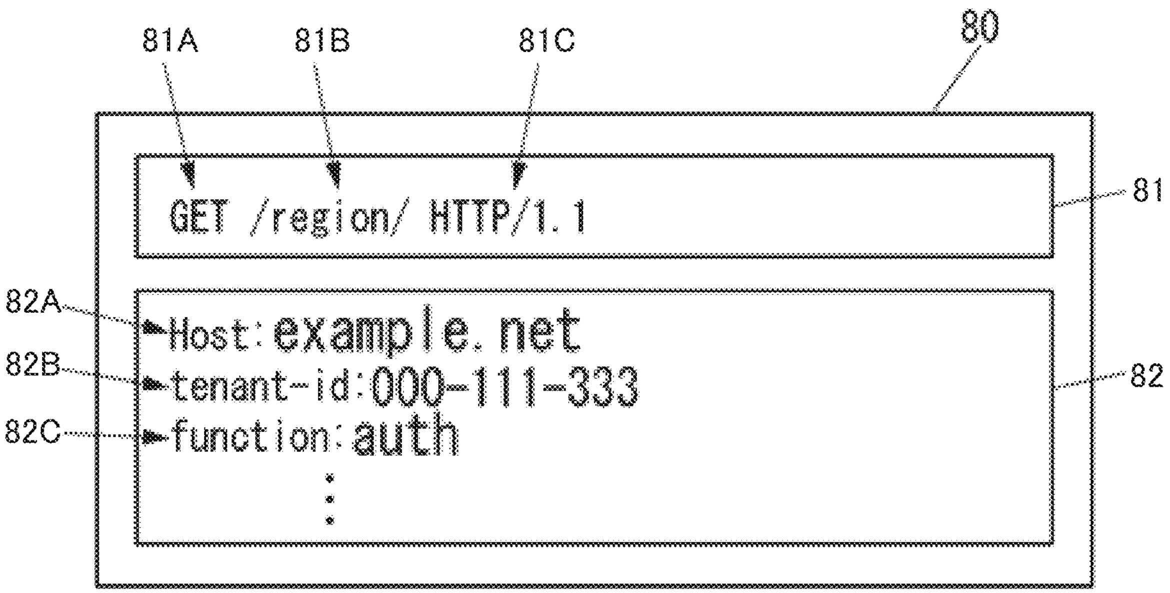
FIG. 9B is a schematic drawing showing another example of the HTTP request of the connection request, transmitted to the preliminary URL.

FIG. 9A illustrates another example of the URL of the transmission destination of the connection request, transmitted from the connection source. FIG. 9B illustrates an example of the HTTP request 80 of the connection request, transmitted to the URL shown in FIG. 9A.

The preliminary URL has, for example, a format as "https://example.net/region/", as shown in FIG. 9A.

The "example.net", representing the domain name in the preliminary URL shown in FIG. 9A, indicates the domain name of the gateway 30. In the section of "region" in the path in the preliminary URL, actually a specific character string indicating the region is written, such as "us" indicating the USA, "eu" indicating Europe, or "as" indicating Asia.

The HTTP request 80 of the connection request transmitted from the connection source to the preliminary URL shown in FIG. 9A has, for example, a structure shown in FIG. 9B.

Although the method 81A is specified as "GET" in the HTTP request 80 shown in FIG. 9B, a method other than "GET" may be applied.

The target 81B corresponds to "/region/", which is the path in the preliminary URL shown in FIG. 9A.

For example, the header field 82 includes the Host header 82A, a tenant-id header 82B designating the tenant ID serving as the identification information of the tenant to be connected, and a function header 82C designating the function of the image processing system cluster 20. The Host header 82A shown in FIG. 9B is "Host: example.net", indicating the domain name in the preliminary URL shown in FIG. 9A. The tenant-id header 82B shown in FIG. 9B is "tenant-id: 000-111-333", indicating the tenant ID "000-111-333". The function header 82C shown in FIG. 9B is "function: auth", indicating the authentication function. The values of the "function" include, for example, "TM" indicating the tenant management function, and "DM" indicating the device management function, in addition to "auth" indicating the authentication function.

FIG. 10 is a table showing the forwarding rule 42.

The forwarding rule 42 shown in FIG. 10 includes the forwarding conditions of the connection request, and the ID serving as the identification information of each forwarding condition and the forwarding destination associated with the forwarding condition, which are specified with respect to each of the forwarding conditions.

The forwarding condition is applied with higher priority, the smaller the numerical value of the ID is. The forwarding condition corresponding to the ID "001" in the forwarding rule 42 is that the path included in the request line 81 of the HTTP request 80 includes a character string "/eu/". The forwarding condition corresponding to the ID "002" in the forwarding rule 42 is that the path included in the request line 81 of the HTTP request 80 includes a character string "/us/". The forwarding condition corresponding to the ID "003" in the forwarding rule 42 is that the value of the tenant-id header 82B in the header field 82 of the HTTP request 80 completely accords with a character string "/000-111-333/". The forwarding condition corresponding to the ID "004" in the forwarding rule 42 is that the value of the function header 82C in the header field 82 of the HTTP request 80 includes a character string "/auth/". The forwarding condition corresponding to the ID "005" in the forwarding rule 42 is that the path included in the request line 81 of the HTTP request 80, and the value of the header in the header field 82 of the HTTP request 80, may include any character string.

There may be cases where the forwarding condition is associated with an instruction to edit the path included in the request line 81 of the HTTP request 80, in the forwarding rule 42. The forwarding conditions corresponding to the ID "003" and "004" in the forwarding rule 42 each include a character string "url action": "non", which indicates that the instruction to edit the path is not associated with the forwarding condition. The forwarding condition corresponding to the ID "001" in the forwarding rule 42 includes a character string "url action": "edit", "/", which indicates that the editing instruction, to substitute the character string "/eu/" in the path included in the request line 81 of the HTTP request 80 with the character string "/", is associated with the forwarding condition. The forwarding condition corresponding to the ID "002" in the forwarding rule 42 includes a character string "url action": "edit", "/", which indicates that the editing instruction, to substitute the character string "/us/" in the path included in the request line 81 of the HTTP request 80 with the character string "/", is associated with the forwarding condition. The character string to be substituted may include a regular expression.

The forwarding destination in the forwarding rule 42 indicates the portion of the URL of the forwarding destination of the connection request, other than the path. The character string "eu.example.com" in the forwarding destination associated with the forwarding condition corresponding to the ID "001" in the forwarding rule 42 indicates, for example, the domain name of the image processing system cluster 20 located in Europe. The character string "us.example.com" in the forwarding destination associated with the forwarding condition corresponding to the ID "002" in the forwarding rule 42 indicates, for example, the domain name of the image processing system cluster 20 located in the USA. The character string "company A.example.com" in the forwarding destination associated with the forwarding condition corresponding to the ID "003" in the forwarding rule 42 indicates, for example, the domain name of the image processing system cluster 20 for the tenant having the tenant ID "000-111-333". The character string "auth.example.com" in the forwarding destination associated with the forwarding condition corresponding to the ID "004" in the forwarding rule 42 indicates, for example, the domain name of the image processing system cluster 20 to be used for the authentication function. The character string "as.example.com" in the forwarding destination associated with the forwarding condition corresponding to the ID "005" in the forwarding rule 42 indicates, for example, the domain name of the image processing system cluster 20 located in Asia.

The forwarding condition corresponding to the ID "005" in the forwarding rule 42 is, as described above, that the path included in the request line 81 of the HTTP request 80, and the value of the header in the header field 82 of the HTTP request 80, may include any character string. Therefore, the forwarding destination associated with the forwarding condition corresponding to the ID "005" in the forwarding rule 42 is a standard forwarding destination, identified when none of the other forwarding conditions are satisfied. Here, it is not mandatory that the forwarding rule 42 includes the standard forwarding destination.

Hereunder, the operation of the gateway 30, performed upon receipt of the connection request from the image forming apparatus 50, the computer 60, or the external system 70, will be described.

Although the following description refers to the case where the gateway 30 has received the connection request from the image forming apparatus 50, the gateway 30 performs similarly upon receipt of the connection request from an image forming apparatus other than the image forming apparatus 50, or from the computer 60 or the external system 70.

As described above, the image forming apparatus 50 transmits the connection request to the preliminary URL, to make connection to the image processing system cluster 20. The following description refers to the case where the preliminary URL is "https://example.net/region/", as shown in FIG. 9A.

Figure 11:
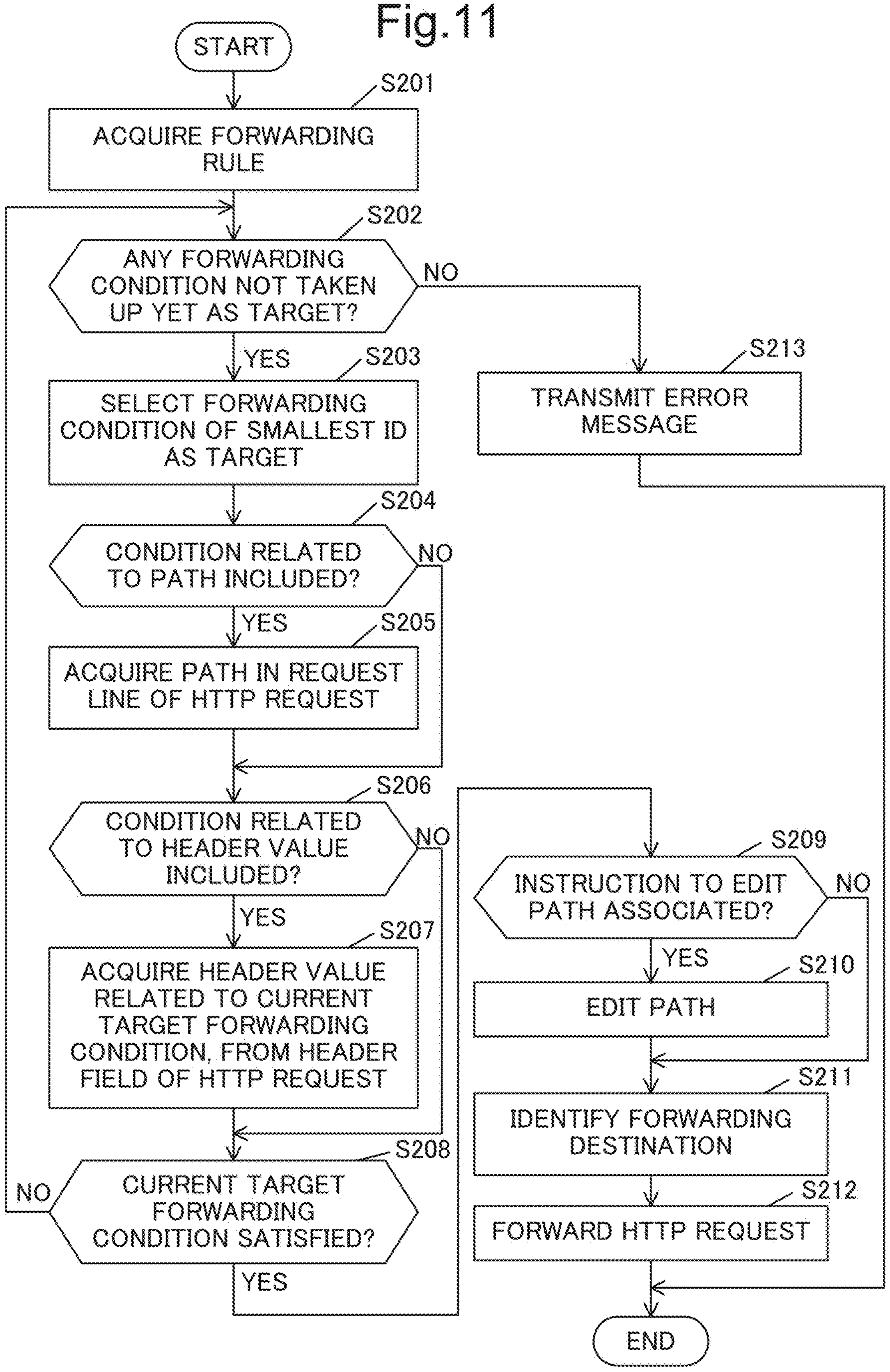
FIG. 11 is a flowchart showing another example of the operation performed by the gateway that has received the connection request.

FIG. 11 is a flowchart showing the operation performed by the gateway 30, upon receipt of the connection request from the image forming apparatus 50.

The connection request forwarding device 35A of the gateway 30 performs, upon receipt of the connection request from the image forming apparatus 50, the operation specified in FIG. 11.

As shown in FIG. 11, the connection request forwarding device 35A acquires the forwarding rule 42, from the database 40 (step S201).

After step S201, the connection request forwarding device 35A decides whether there are any forwarding conditions that have not been applied yet, in the current operation according to FIG. 11, in the forwarding rule 42 acquired (step S202).

Upon deciding at step S202 that there are forwarding conditions that have not been applied yet in the current operation according to FIG. 11, in the forwarding rule 42, the connection request forwarding device 35A selects one forwarding condition having the smallest ID as the applicable forwarding condition, out of the forwarding conditions that have not been applied yet in the current operation according to FIG. 11, in the forwarding rule 42 (step S203).

After step S203, the connection request forwarding device 35A decides whether the condition related to the path included in the request line 81 of the HTTP request 80 is included in the current applicable forwarding condition (step S204).

Upon deciding at step S204 that the condition related to the path included in the request line 81 of the HTTP request 80 is included in the current applicable forwarding condition, the connection request forwarding device 35A acquires the path included in the request line 81 of the HTTP request 80 of the connection request received from the image forming apparatus 50 (step S205). In other words, the connection request forwarding device 35A acquires the path included in the preliminary URL.

Upon deciding at step S204 that the condition related to the path included in the request line 81 of the HTTP request 80 is not included in the current applicable forwarding condition, or upon finishing the operation of step S205, the connection request forwarding device 35A decides whether the condition related to the value of the header in the header field 82 of the HTTP request 80 is included in the current target condition (step S206).

Upon deciding at step S206 that the condition related to the value of the header in the header field 82 of the HTTP request 80 is included in the current target condition, the connection request forwarding device 35A acquires the value of the header related to the current target condition, from the header field 82 in the HTTP request 80 of the connection request received from the image forming apparatus 50 (step S207).

Upon deciding at step S206 that the condition related to the value of the header in the header field 82 of the HTTP request 80 is not included in the current target condition, or upon finishing the operation of step S207, the connection request forwarding device 35A decides whether the current applicable forwarding condition is satisfied (step S208). Here, in the case where the path has been acquired at step S205, the connection request forwarding device 35A decides whether the current applicable forwarding condition is satisfied, at least on the basis of the acquired path. Likewise, in the case where the value has been acquired at step S207, the connection request forwarding device 35A decides whether the current applicable forwarding condition is satisfied, at least on the basis of the acquired value.

Upon deciding at step S208 that the current applicable forwarding condition is not satisfied, the connection request forwarding device 35A executes the operation of step S202.

Upon deciding at step S208 that the current applicable forwarding condition is satisfied, the connection request forwarding device 35A decides whether the instruction to edit the path is associated with the current applicable forwarding condition, in the forwarding rule 42 (step S209).

Upon deciding at step S209 that the instruction to edit the path is associated with the current applicable forwarding condition, in the forwarding rule 42, the connection request forwarding device 35A edits the path included in the request line 81 of the HTTP request 80, according to the editing instruction associated with the current applicable forwarding condition (step S210). For example, when the forwarding rule 42 acquired at step S201 is specified as shown in FIG. 10, and the request line 81 of the HTTP request 80 is written as “GET/eu/HTTP/1.1”, the forwarding condition having the ID “001” corresponds to the current applicable forwarding condition. Therefore, the connection request forwarding device 35A edits the request line 81 of the HTTP request 80 as “GET/HTTP/1.1”, at step S210.

Upon deciding at step S209 that the instruction to edit the path is not associated with the current applicable forwarding condition in the forwarding rule 42, or upon finishing the operation of step S210, the connection request forwarding device 35A identifies the forwarding destination associated with the current applicable forwarding condition in the forwarding rule 42 acquired (step S211).

After step S211, the connection request forwarding device 35A forwards the HTTP request 80 to the image processing system cluster 20, corresponding to the forwarding destination identified at step S211 (step S212), and finishes the operation shown in FIG. 11.

Upon deciding at step S202 that there are no forwarding conditions that have not been applied yet in the current operation according to FIG. 11, in the forwarding rule 42, the connection request forwarding device 35A transmits an error message such as “404 not found”, to the image forming apparatus 50 that is the connection source (step S213), and finishes the operation shown in FIG. 11.

Figure 12A:
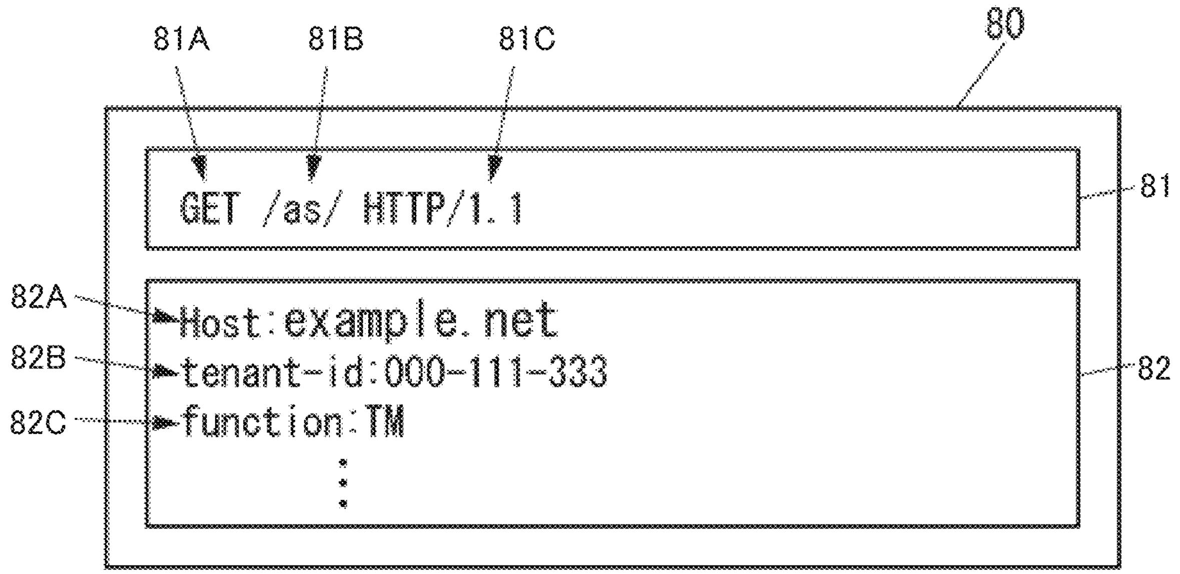
FIG. 12A is a schematic drawing showing another example of the HTTP request of the connection request, transmitted to the preliminary URL.
Figure 12B:
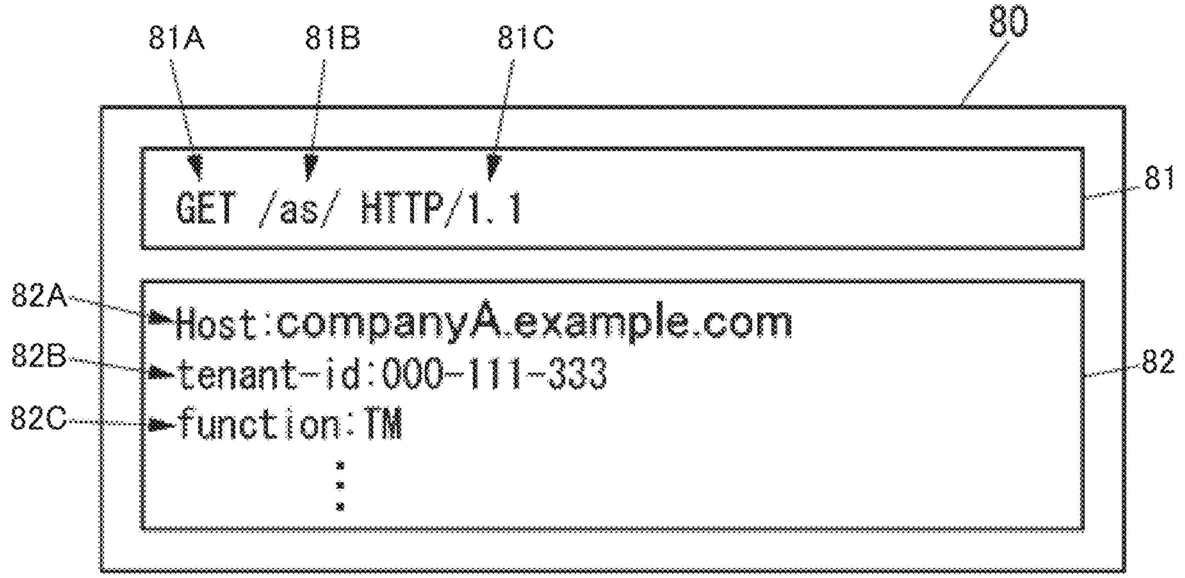
FIG. 12B is a schematic drawing showing another example of the HTTP request, transmitted to the image processing system cluster.

FIG. 12A illustrates the HTTP request 80 of the connection request transmitted to the preliminary URL, different from the one shown in FIG. 9B. FIG. 12B illustrates an example of the HTTP request 80, forwarded by the connection request forwarding device 35A that has received the HTTP request 80 shown in FIG. 12A, to the image processing system cluster 20.

When the connection request forwarding device 35A receives the HTTP request 80 shown in FIG. 12A, with the forwarding rule 42 being specified as shown in FIG. 10, the forwarding condition corresponding to the ID “003” is satisfied, at least on the basis of the value of the tenant-id header 82B in the header field 82 of the HTTP request 80 (YES at step S208), and the instruction to edit the path is not associated with the forwarding condition corresponding to the ID “003” in the forwarding rule 42 (NO at step S209). Therefore, the connection request forwarding device 35A rewrites the Host header 82A of the HTTP request 80 from “Host: example.net” (see FIG. 12A) to “Host: company A.example.com” (see FIG. 12B), indicating the domain name of the forwarding destination associated with the forwarding condition corresponding to the ID “003”, and forwards the HTTP request 80 shown in FIG. 12B (step S212).

Figure 13A:
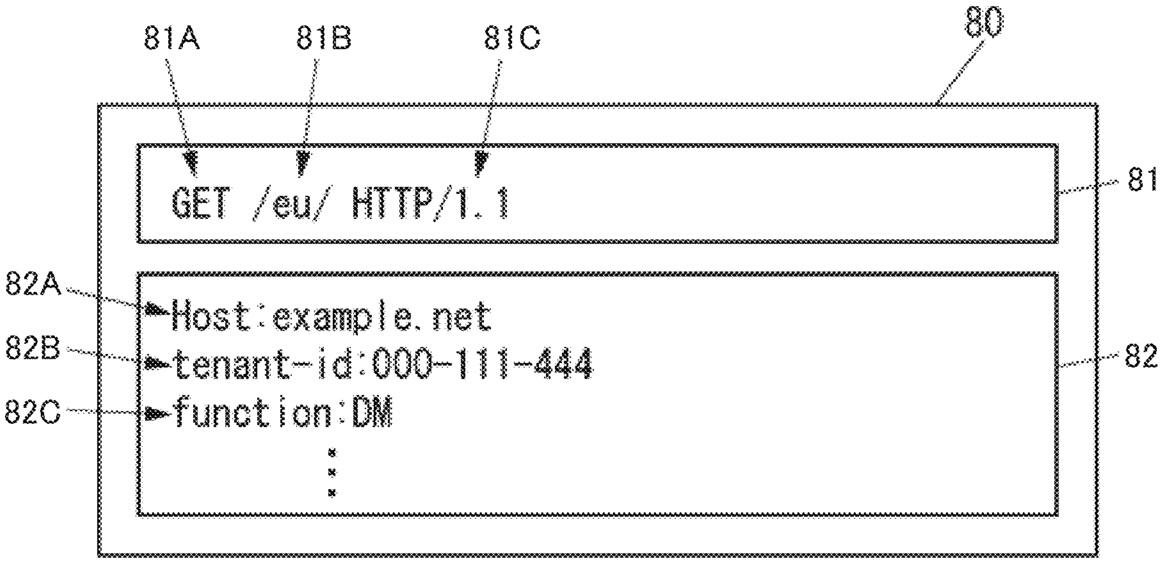
FIG. 13A is a schematic drawing showing another example of the HTTP request of the connection request, transmitted to the preliminary URL.
Figure 13B:
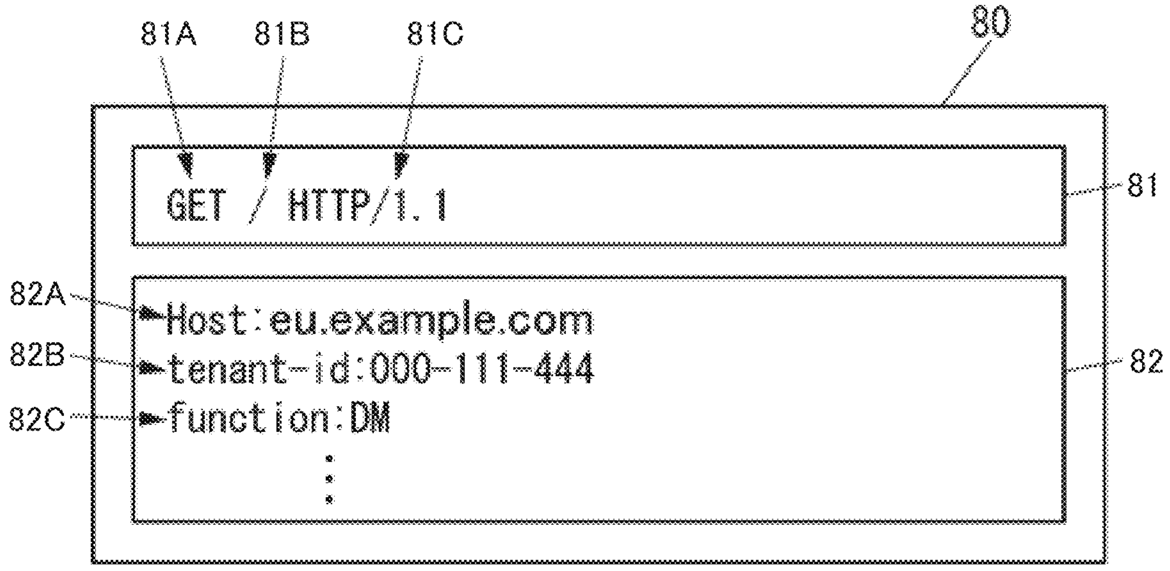
FIG. 13B is a schematic drawing showing another example of the HTTP request, transmitted to the image processing system cluster.

FIG. 13A illustrates an example of the HTTP request 80 of the connection request, transmitted to the preliminary URL, different from the one shown in FIG. 9B and FIG. 12A. FIG. 13B illustrates an example of the HTTP request 80, forwarded by the connection request forwarding device 35A that has received the HTTP request 80 shown in FIG. 13A, to the image processing system cluster 20.

When the connection request forwarding device 35A receives the HTTP request 80 shown in FIG. 13A, with the forwarding rule 42 being specified as shown in FIG. 10, the forwarding condition corresponding to the ID “001” is satisfied, at least on the basis of the path included in the request line 81 of the HTTP request 80 (YES at step S208), and the instruction to edit the path is associated with the forwarding condition corresponding to the ID “001” in the forwarding rule 42 (YES at step S209). Therefore, the connection request forwarding device 35A deletes “/eu” from the path included in the target 81B of the request line 81 of the HTTP request 80 as shown in FIG. 13B (step S210), and rewrites the Host header 82A of the HTTP request 80 from “Host: example.net” (see FIG. 13A) to “Host: eu.example.com” (see FIG. 13B), indicating the domain name of the forwarding destination associated with the forwarding condition corresponding to the ID “001”, and then forwards the HTTP request 80 shown in FIG. 13B (step S212)

As described above, according to the second embodiment, the gateway 30 forwards the connection request, to the image processing system cluster 20 corresponding to the forwarding destination, associated in the forwarding rule 42 with the forwarding condition that is satisfied at least on the basis of the value of the specific header in the header field 82 of the HTTP request 80 of the connection request from the connection source (step S201 to step S208, step S211, and step S212). Therefore, the connection request from the connection source can be forwarded to the appropriate one of the plurality of image processing system clusters 20, according to the detail of the connection request.

According to the second embodiment, when the forwarding condition corresponding to the ID “003” or “004” is satisfied, in other words when the value of the specific header in the header field 82 of the HTTP request 80 at least includes a specific character string, the gateway 30 forwards the connection request to the specific image processing system cluster 20. Therefore, the connection request from the connection source can be forwarded to the appropriate image processing system clusters 20, with a simple configuration.

According to the second embodiment, the forwarding condition including a condition that the value of the specific header in the header field 82 of the HTTP request 80 includes a character string indicating a specific tenant using the image processing system cluster 20 (forwarding condition corresponding to the ID “003”), is associated, in the forwarding rule 41, with the forwarding destination, which is the image processing system cluster 20 assigned to this tenant. Therefore, when the value of the specific header in the header field 82 of the HTTP request 80 at least includes the character string indicating the specific tenant using the image processing system cluster 20, the gateway 30 can forward the connection request, to the image processing system cluster 20 assigned to the specific tenant.

Here, the forwarding condition including the condition that the value of the specific header in the header field 82 of the HTTP request 80 includes the character string indicating the specific tenant using the image processing system cluster 20, does not necessarily have to be associated with the forwarding destination, which is the image processing system cluster 20 assigned to the specific tenant, in the forwarding rule 42.

According to the second embodiment, the forwarding condition including a condition that the value of the specific header in the header field 82 of the HTTP request 80 includes the character string indicating a specific function of the image processing system cluster 20 (forwarding condition corresponding to the ID “004”), is associated, in the forwarding rule 42, with the forwarding destination, which is the image processing system cluster 20 to be used for this function. Therefore, when the value of the specific header in the header field 82 of the HTTP request 80 at least includes the character string indicating the specific function of the image processing system cluster 20, the gateway 30 can forward the connection request, to the image processing system cluster 20 to be used for the specific function.

Here, the forwarding condition including the condition that the value of the specific header in the header field 82 of the HTTP request 80 includes the character string indicating the specific function of the image processing system cluster 20, does not necessarily have to be associated with the forwarding destination, which is the image processing system cluster 20 to be used for the specific function, in the forwarding rule 42.

According to the second embodiment, further, when the instruction to edit the path included in the request line 81 of the HTTP request 80 of the connection request is associated with the forwarding condition satisfied in the forwarding rule 42 (YES at step S209), the gateway 30 edits the path according to the instruction (step S210), and forwards the connection request (step S212). Therefore, the configuration of the image processing system cluster 20, which is the forwarding destination of the connection request, can be modified so as to accord with the edited path.

For example, the instruction to edit the path associated, in the forwarding rule 42, with the forwarding condition corresponding to the ID “001” or “002” in the forwarding rule 42, is the instruction to delete the character string indicating the region, from the path. Therefore, when the forwarding condition corresponding to the ID “001” or “002” in the forwarding rule 42 is satisfied at least on the basis of the path, the plurality of image processing system clusters 20, to which the connection request is forwarded, may be configured to perform the same operation, irrespective of the region. In other words, the code of the application program for realizing those image processing system clusters 20 may be common to all the image processing system clusters 20. The second embodiment refers to the case where the path is edited, when the forwarding condition in the forwarding rule 42 is satisfied at least on the basis of the path. However, the path may also be edited when the forwarding condition in the forwarding rule 42 is satisfied, at least on the basis of the value of the specific header in the header field 82 of the HTTP request 80.

The forwarding rule 42 includes, among the region, the tenant ID, and the function, the forwarding condition only related to the region (forwarding condition corresponding to the ID “001” or “002”), the forwarding condition only related to the tenant ID (forwarding condition corresponding to the ID “003”), and the forwarding condition only related to the function (forwarding condition corresponding to the ID “004”). Instead, the forwarding rule 42 may include at least one of the forwarding condition related to all of the region, the tenant ID, and the function, the forwarding condition only related to the region and the tenant ID, the forwarding condition only related to the region and the function, and the forwarding condition only related to the tenant ID and the function.

For example, the forwarding conditions only related to the region and the function can be exemplified by a condition that “the path included in the request line 81 of the HTTP request 80 includes a character string indicating a specific region”, or that “the value of the specific header in the header field 82 of the HTTP request 80 includes a character string indicating a specific function of the image processing system cluster 20”, or a condition that “the path included in the request line 81 of the HTTP request 80 includes a character string indicating a specific region, and the value of the specific header in the header field 82 of the HTTP request 80 includes a character string indicating a specific function of the image processing system cluster 20".

The forwarding rule 42 may be specified such that the forwarding condition related to both of the tenant ID and the function is applied with the highest priority, among the forwarding condition related to both of the tenant ID and the function, the forwarding condition only related to the tenant ID, and the forwarding condition only related to the function. Likewise, the forwarding rule 42 may be specified such that the forwarding condition only related to the tenant ID is applied with higher priority, among the forwarding condition only related to the function and the forwarding condition only related to the tenant ID.

The second embodiment refers to the case where the header field 82 includes the tenant-id header 82B and the function header 82C. However, at least one of the tenant-id header 82B and the function header 82C may be excluded from the header field 82. For example, when the header field 82 does not include the tenant-id header 82B, the preliminary URL and the HTTP request 80 may be formed as shown in FIG. 14A and FIG. 14B.

Figure 14A:
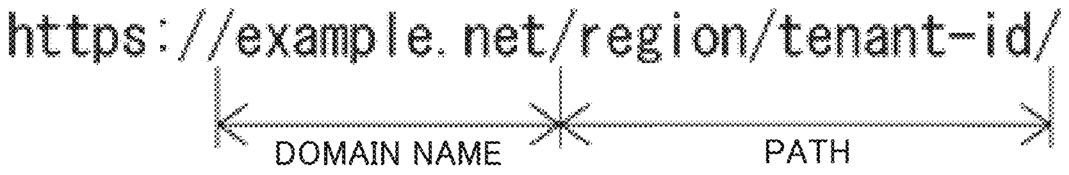
FIG. 14A is a schematic drawing showing another example of the preliminary URL.

FIG. 14A illustrates an example of the preliminary URL, different from the one shown in FIG. 9A. FIG. 14B illustrates an example of the HTTP request 80, different from the one shown in FIG. 9B.

In the section of "tenant-id" in "https://example.net/region/tenant-id/" which is the preliminary URL shown in FIG. 14A, actually a specific character string indicating the tenant ID, such as "000-111-333", is written. The header field 82 of the HTTP request 80 shown in FIG. 14B does not include the tenant-id header 82B (see FIG. 9A and FIG. 9B).

Figure 14B:
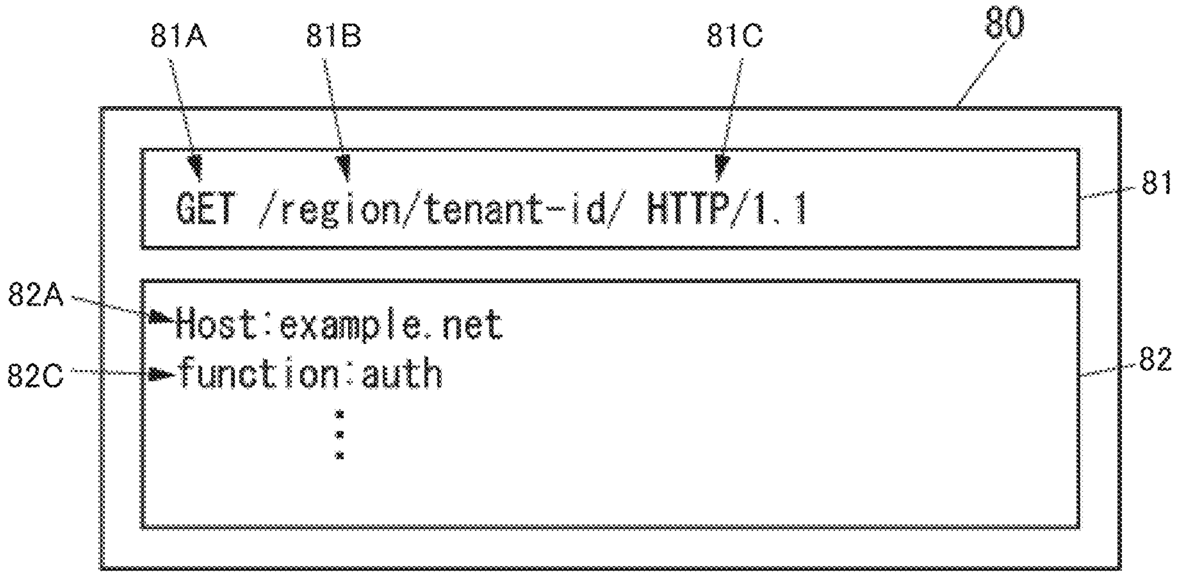
FIG. 14B is a schematic drawing showing another example of the HTTP request of the connection request, transmitted to the preliminary URL.

When the preliminary URL and the HTTP request 80 are formed as shown in FIG. 14A and FIG. 14B, the forwarding rule 42 may be specified as shown in FIG. 15.

FIG. 15 is a table showing an example of the forwarding rule 42, different from the one shown in FIG. 10.

The forwarding condition corresponding to the ID "003" in the forwarding rule 42 shown in FIG. 15, is a condition that the path included in the request line 81 of the HTTP request 80 includes the character string "/000-111-333/".

In the second embodiment, the condition related to the value of the tenant-id header 82B in the header field 82 of the HTTP request 80, and the condition related to the value of the function header 82C have been presented, as the forwarding condition. However, the forwarding condition may include a condition related to the value of a specific header in the header field 82 of the HTTP request 80, different from either of the tenant-id header 82B and the function header 82C.

Third Embodiment

Hereunder, a configuration of the system 10 according to a third embodiment will be described. Regarding the system 10 according to the third embodiment, the description of the same configuration as that of the first embodiment will not be repeated.

Figure 16A:
FIG. 16A is a schematic drawing showing another example of the preliminary URL.
Figure 16B:
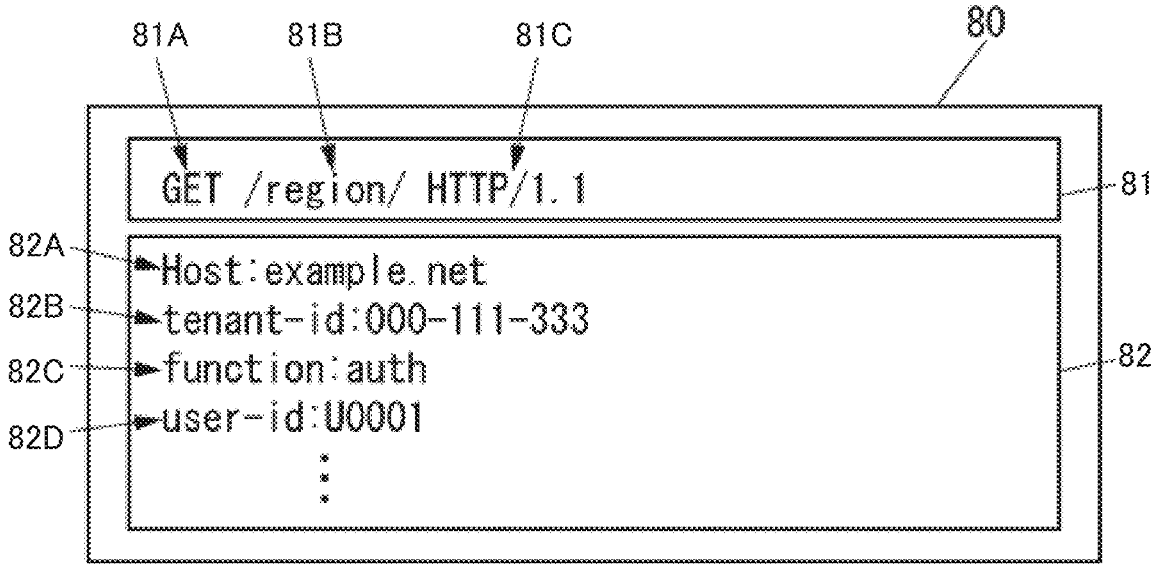
FIG. 16B is a schematic drawing showing another example of the HTTP request of the connection request, transmitted to the preliminary URL.

FIG. 16A illustrates another example of the URL of the transmission destination of the connection request transmitted from the connection source. FIG. 16B illustrates an example of the HTTP request 80 of the connection request, transmitted to the URL shown in FIG. 16A.

The preliminary URL has, for example, a format as "https://example.net/region/", as shown in FIG. 16A.

The "example.net", representing the domain name in the preliminary URL shown in FIG. 16A, indicates the domain name of the gateway 30. In the section of "region" in the path in the preliminary URL, actually a specific character string indicating the region is written, such as "us" indicating the USA, "eu" indicating Europe, or "as" indicating Asia.

The HTTP request 80 of the connection request transmitted from the connection source to the preliminary URL shown in FIG. 16A has, for example, a structure shown in FIG. 16B.

Although the method 81A is specified as "GET" in the HTTP request 80 shown in FIG. 16B, a method other than "GET" may be applied.

The target 81B corresponds to "/region/", which is the path in the preliminary URL shown in FIG. 16A.

For example, the header field 82 includes the Host header 82A, the tenant-id header 82B, the function header 82C, and a user-id header 82D designating the user ID representing the identification information of the user who has executed the connection request. The Host header 82A shown in FIG. 16B is "Host: example.net", indicating the domain name in the preliminary URL shown in FIG. 16A. The tenant-id header 82B shown in FIG. 16B is "tenant-id: 000-111-333", indicating the tenant ID "000-111-333". The function header 82C shown in FIG. 16B is "function: auth", indicating the authentication function. The user-id header 82D shown in FIG. 16B is "user-id: U0001" indicating the user ID "U0001".

FIG. 17 is a table showing a forwarding rule 43.

The forwarding rule 43 shown in FIG. 17 includes the forwarding conditions of the connection request, and the ID serving as the identification information of each forwarding condition, the forwarding destination associated with the forwarding condition, and prohibition conditions on the forward of the connection request, associated with the forwarding condition, which are specified with respect to each of the forwarding conditions.

The forwarding condition is applied with higher priority, the smaller the numerical value of the ID is. The forwarding condition corresponding to the ID "001" in the forwarding rule 43 is that the path included in the request line 81 of the HTTP request 80 includes a character string "/eu/". The forwarding condition corresponding to the ID "002" in the forwarding rule 43 is that the path included in the request line 81 of the HTTP request 80 includes a character string "/us/". The forwarding condition corresponding to the ID "003" in the forwarding rule 43 is that the value of the tenant-id header 82B in the header field 82 of the HTTP request 80 completely accords with a character string "/000-111-333/". The forwarding condition corresponding to the ID "004" in the forwarding rule 43 is that the value of the function header 82C in the header field 82 of the HTTP request 80 includes a character string "/auth/". The forwarding condition corresponding to the ID "005" in the forwarding rule 43 is that the path included in the request line 81 of the HTTP request 80, and the value of the header in the header field 82 of the HTTP request 80, may include any character string.

There may be cases where the forwarding condition is associated with an instruction to edit the path included in the request line 81 of the HTTP request 80, in the forwarding rule 43. The forwarding conditions corresponding to the ID "003" and "004" in the forwarding rule 43 each include a character string "url action": "non", which indicates that the instruction to edit the path is not associated with the forwarding condition. The forwarding condition corresponding to the ID "001" in the forwarding rule 43 includes a character string "url action": "edit", "/", which indicates that the editing instruction, to substitute the character string "/eu/" in the path included in the request line 81 of the HTTP request 80 with the character string "/", is associated with the forwarding condition. The forwarding condition corresponding to the ID "002" in the forwarding rule 43 includes a character string "url action": "edit", "/", which indicates that the editing instruction, to substitute the character string "/us/" in the path included in the request line 81 of the HTTP request 80 with the character string "/", is associated with the forwarding condition. The character string to be substituted may include a regular expression.

The forwarding destination in the forwarding rule 43 indicates the portion of the URL of the forwarding destination of the connection request, other than the path. The character string "eu.example.com" in the forwarding destination associated with the forwarding condition corresponding to the ID "001" in the forwarding rule 43 indicates, for example, the domain name of the image processing system cluster 20 located in Europe. The character string "us.example.com" in the forwarding destination associated with the forwarding condition corresponding to the ID "002" in the forwarding rule 43 indicates, for example, the domain name of the image processing system cluster 20 located in the USA. The character string "companyA.example.com" in the forwarding destination associated with the forwarding condition corresponding to the ID "003" in the forwarding rule 43 indicates, for example, the domain name of the image processing system cluster 20 for the tenant having the tenant ID "000-111-333". The character string "auth.example.com" in the forwarding destination associated with the forwarding condition corresponding to the ID "004" in the forwarding rule 43 indicates, for example, the domain name of the image processing system cluster 20 to be used for the authentication function. The character string "as.example.com" in the forwarding destination associated with the forwarding condition corresponding to the ID "005" in the forwarding rule 43 indicates, for example, the domain name of the image processing system cluster 20 located in Asia.

The forwarding condition corresponding to the ID "005" in the forwarding rule 43 is, as described above, that the path included in the request line 81 of the HTTP request 80, and the value of the header in the header field 82 of the HTTP request 80, may include any character string. Therefore, the forwarding destination associated with the forwarding condition corresponding to the ID "005" in the forwarding rule 43 is a standard forwarding destination, identified when none of the other forwarding conditions are satisfied. Here, it is not mandatory that the forwarding rule 43 includes the standard forwarding destination.

The prohibition condition, associated with the forwarding condition corresponding to the ID "001" in the forwarding rule 43, is that "the internet protocol (IP) address of the connection source is one of 192.0.2.0 to 192.0.2.10, and the tenant ID is 000-111-333 or 000-111-444". The prohibition condition associated with the forwarding condition corresponding to the ID "002" in the forwarding rule 43, is that "the IP address of the connection source is one of 192.0.2.20 to 192.0.2.30", or "the user ID is U0001 or U0002". The prohibition condition associated with the forwarding condition corresponding to the ID "003" in the forwarding rule 43, is that "the user ID is U0003". The prohibition condition associated with the forwarding condition corresponding to the ID "004" in the forwarding rule 43, is that "the IP address of the connection source is 192.0.2.40", or "the tenant ID is 000-111-555". There is no prohibition condition that is associated with the forwarding condition corresponding to the ID "005" in the forwarding rule 43.

Hereunder, the operation of the gateway 30, performed upon receipt of the connection request from the image forming apparatus 50, the computer 60, or the external system 70, will be described.

Although the following description refers to the case where the gateway 30 has received the connection request from the image forming apparatus 50, the gateway 30 performs similarly upon receipt of the connection request from an image forming apparatus other than the image forming apparatus 50, or from the computer 60 or the external system 70.

As described above, the image forming apparatus 50 transmits the connection request to the preliminary URL, to make connection to the image processing system cluster 20. The following description refers to the case where the preliminary URL is "https://example.net/region/", as shown in FIG. 16A.

Figure 18:
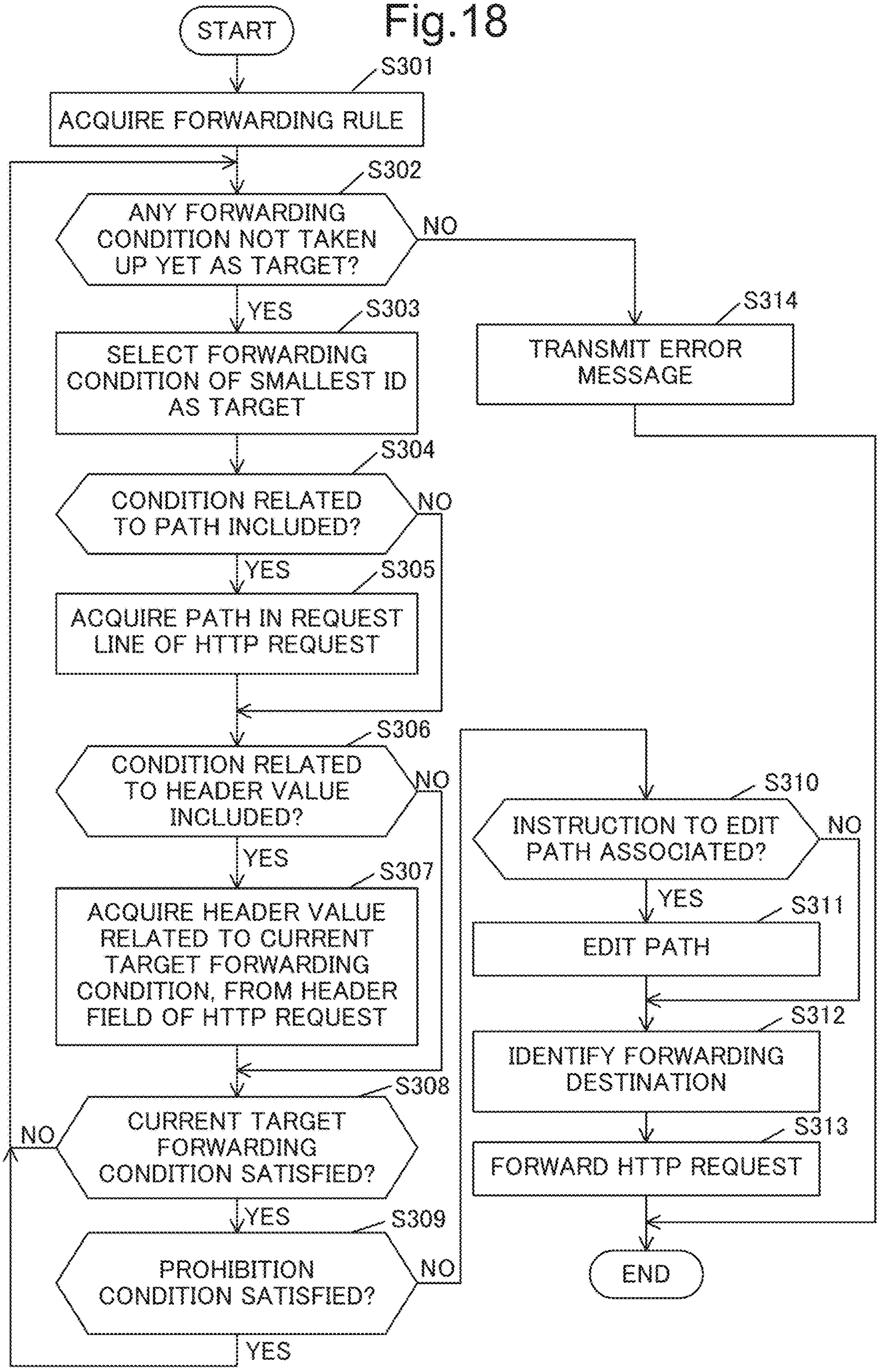
FIG. 18 is a flowchart showing another example of the operation performed by the gateway that has received the connection request.

FIG. 18 is a flowchart showing the operation performed by the gateway 30, upon receipt of the connection request from the image forming apparatus 50.

The connection request forwarding device 35A of the gateway 30 performs, upon receipt of the connection request from the image forming apparatus 50, the operation specified in FIG. 18.

As shown in FIG. 18, the connection request forwarding device 35A acquires the forwarding rule 43, from the database 40 (step S301).

After step S301, the connection request forwarding device 35A decides whether there are any forwarding conditions that have not been applied yet in the current operation according to FIG. 18, in the forwarding rule 43 acquired (step S302).

Upon deciding at step S302 that there are forwarding conditions that have not been applied yet in the current operation according to FIG. 18, in the forwarding rule 43, the connection request forwarding device 35A selects one forwarding condition having the smallest ID as the target, out of the forwarding conditions that have not been applied yet in the current operation according to FIG. 18, in the forwarding rule 43 (step S303).

After step S303, the connection request forwarding device 35A decides whether the condition related to the path included in the request line 81 of the HTTP request 80 is included in the current applicable forwarding condition (step S304).

Upon deciding at step S304 that the condition related to the path included in the request line 81 of the HTTP request 80 is included in the current applicable forwarding condition, the connection request forwarding device 35A acquires the path included in the request line 81 of the HTTP request 80 of the connection request received from the image forming apparatus 50 (step S305). In other words, the connection request forwarding device 35A acquires the path included in the preliminary URL.

Upon deciding at step S304 that the condition related to the path included in the request line 81 of the HTTP request 80 is not included in the current applicable forwarding condition, or upon finishing the operation of step S305, the connection request forwarding device 35A decides whether the condition related to the value of the header in the header field 82 of the HTTP request 80 is included in the current target condition (step S306).

Upon deciding at step S306 that the condition related to the value of the header in the header field 82 of the HTTP request 80 is included in the current target condition, the connection request forwarding device 35A acquires the value of the header related to the current target condition, from the header field 82 in the HTTP request 80 of the connection request received from the image forming apparatus 50 (step S307).

Upon deciding at step S306 that the condition related to the value of the header in the header field 82 of the HTTP request 80 is not included in the current target condition, or upon finishing the operation of step S307, the connection request forwarding device 35A decides whether the current applicable forwarding condition is satisfied (step S308). Here, in the case where the path has been acquired at step S305, the connection request forwarding device 35A decides whether the current applicable forwarding condition is satisfied, at least on the basis of the acquired path. Likewise, in the case where the value has been acquired at step S307, the connection request forwarding device 35A decides whether the current applicable forwarding condition is satisfied, at least on the basis of the acquired value.

Upon deciding at step S308 that the current applicable forwarding condition is not satisfied, the connection request forwarding device 35A executes the operation of step S302.

Upon deciding at step S308 that the current applicable forwarding condition is satisfied, the connection request forwarding device 35A decides whether the prohibition condition, associated with the current applicable forwarding condition in the acquired forwarding rule 43, is satisfied (step S309).

Here, when the prohibition condition associated with the current applicable forwarding condition in the acquired forwarding rule 43 includes the IP address of the connection source, the connection request forwarding device 35A may use the IP address of the connection source, notified therefrom, at step S309. For example, when the IP address of the connection source is included in the header field 82 of the HTTP request 80, the connection request forwarding device 35A may acquire the IP address of the connection source from the header field 82, at step S309.

When the prohibition condition associated with the current applicable forwarding condition in the acquired forwarding rule 43 includes the tenant ID, the connection request forwarding device 35A may acquire the value of the tenant-id header 82B in the header field 82 of the HTTP request 80 as the tenant ID, at step S309.

When the prohibition condition associated with the current applicable forwarding condition in the acquired forwarding rule 43 includes the user ID, the connection request forwarding device 35A may acquire the value of the user-id header 82D in the header field 82 of the HTTP request 80 as the user ID, at step S309.

When there is no prohibition condition that is associated with the current applicable forwarding condition in the acquired forwarding rule 43, the connection request forwarding device 35A decides that the prohibition condition is not satisfied, at step S309.

Upon deciding at step S309 that the prohibition condition associated with the current applicable forwarding condition in the acquired forwarding rule 43 is satisfied, the connection request forwarding device 35A executes the operation of step S302.

Upon deciding at step S309 that the prohibition condition associated with the current applicable forwarding condition in the acquired forwarding rule 43 is not satisfied, the connection request forwarding device 35A decides whether the instruction to edit the path is associated with the current applicable forwarding condition, in the forwarding rule 43 (step S310).

Upon deciding at step S310 that the instruction to edit the path is associated with the current applicable forwarding condition in the forwarding rule 43, the connection request forwarding device 35A edits the path included in the request line 81 of the HTTP request 80, according to the editing instruction associated with the current applicable forwarding condition in the forwarding rule 43 (step S311). For example, when the forwarding rule 43 acquired at step S301 is specified as shown in FIG. 17, and the request line 81 of the HTTP request 80 is written as "GET/eu/HTTP/1.1", the forwarding condition having the ID "001" corresponds to the current applicable forwarding condition. Therefore, the connection request forwarding device 35A edits the request line 81 of the HTTP request 80 as "GET/HTTP/1.1", at step S311.

Upon deciding at step S310 that the instruction to edit the path is not associated with the current applicable forwarding condition in the forwarding rule 43, or upon finishing the operation of step S311, the connection request forwarding device 35A identifies the forwarding destination associated with the current applicable forwarding condition in the forwarding rule 43 acquired (step S312).

After step S312, the connection request forwarding device 35A forwards the HTTP request 80 to the image processing system cluster 20, corresponding to the forwarding destination identified at step S312 (step S313), and finishes the operation shown in FIG. 18.

Upon deciding at step S302 that there are no forwarding conditions that have not been applied yet in the current operation according to FIG. 18, in the forwarding rule 43, the connection request forwarding device 35A transmits an error message such as "404 not found", to the image forming apparatus 50 that is the connection source (step S314), and finishes the operation shown in FIG. 18.

Figure 19A:
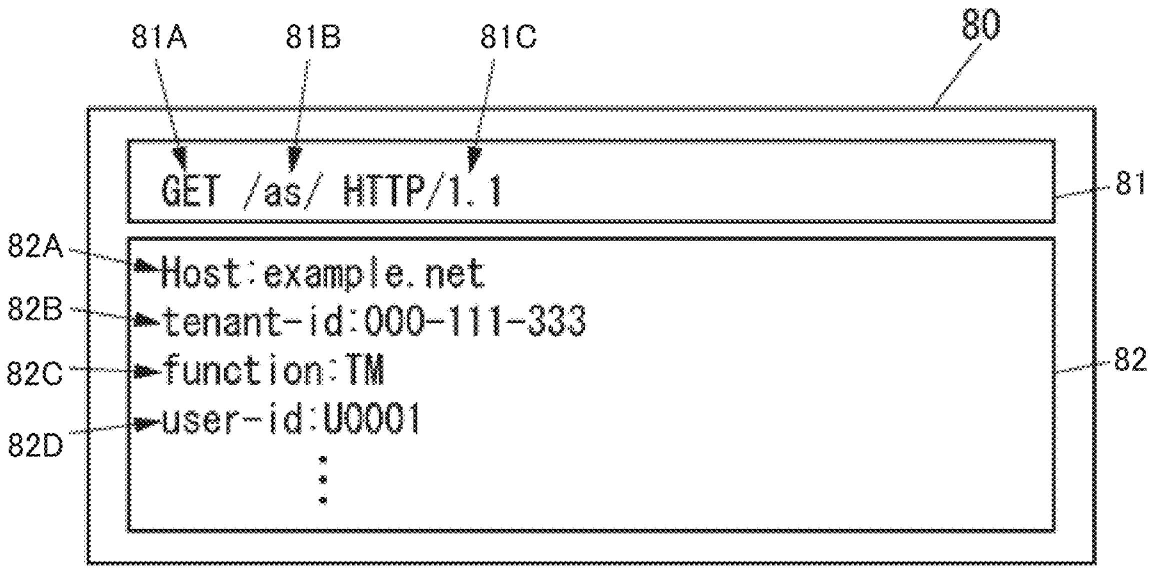
FIG. 19A is a schematic drawing showing another example of the HTTP request of the connection request, transmitted to the preliminary URL.
Figure 19B:
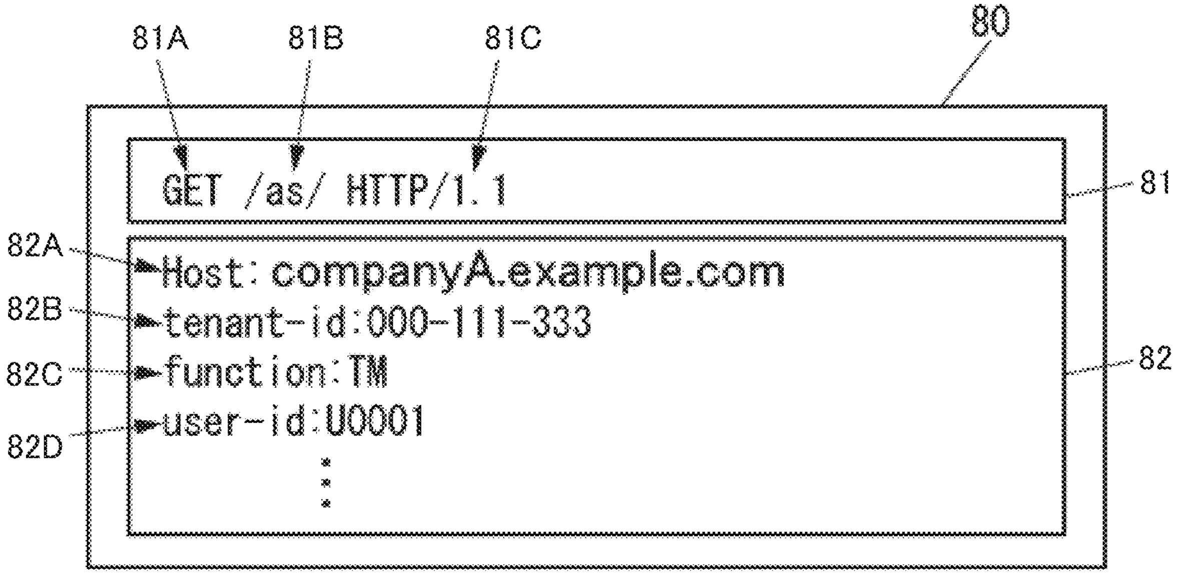
FIG. 19B is a schematic drawing showing another example of the HTTP request, transmitted to the image processing system cluster.

FIG. 19A illustrates the HTTP request 80 of the connection request transmitted to the preliminary URL, different from the one shown in FIG. 16B. FIG. 19B illustrates an example of the HTTP request 80, forwarded by the connection request forwarding device 35A that has received the HTTP request 80 shown in FIG. 19A, to the image processing system cluster 20.

When the connection request forwarding device 35A receives the HTTP request 80 shown in FIG. 19A from the forwarding source having the IP address "192.0.2.50", with the forwarding rule 43 being specified as shown in FIG. 17, the forwarding condition corresponding to the ID "003" is satisfied, at least on the basis of the value of the tenant-id header 82B in the header field 82 of the HTTP request 80 (YES at step S308), the prohibition condition is not satisfied (NO at step S309), and the instruction to edit the path is not associated with the forwarding condition corresponding to the ID "003" in the forwarding rule 43 (NO at step S310). Therefore, the connection request forwarding device 35A rewrites the Host header 82A of the HTTP request 80 from "Host: example.net" (see FIG. 19A) to "Host: company-A.example.com" (see FIG. 19B), indicating the domain name of the forwarding destination associated with the forwarding condition corresponding to the ID "003", and forwards the HTTP request 80 shown in FIG. 19B (step S313).

Figure 20A:
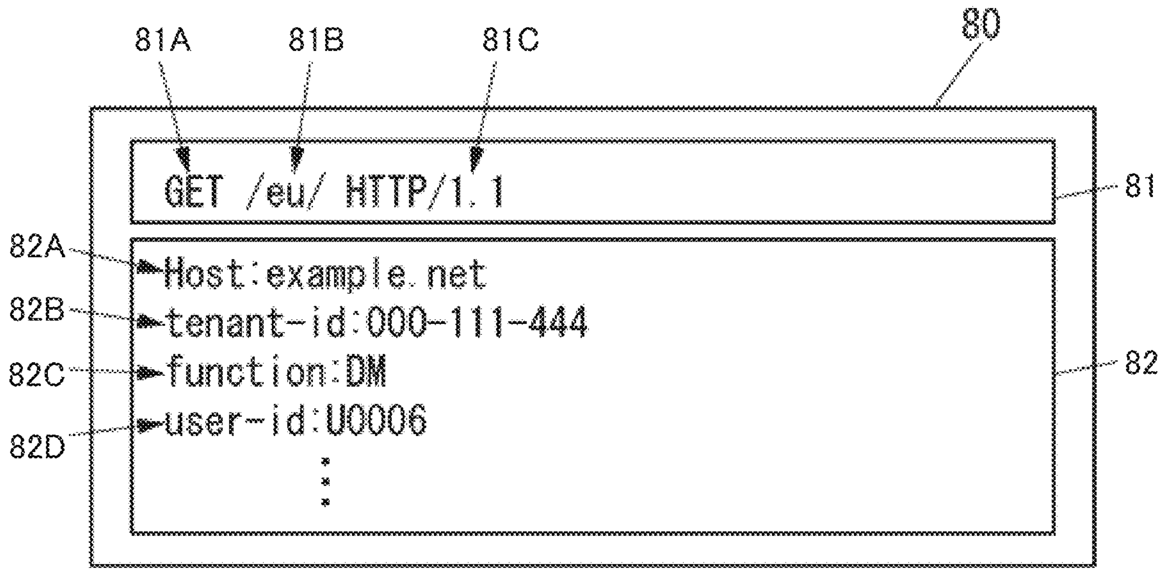
FIG. 20A is a schematic drawing showing another example of the HTTP request of the connection request, transmitted to the preliminary URL.
Figure 20B:
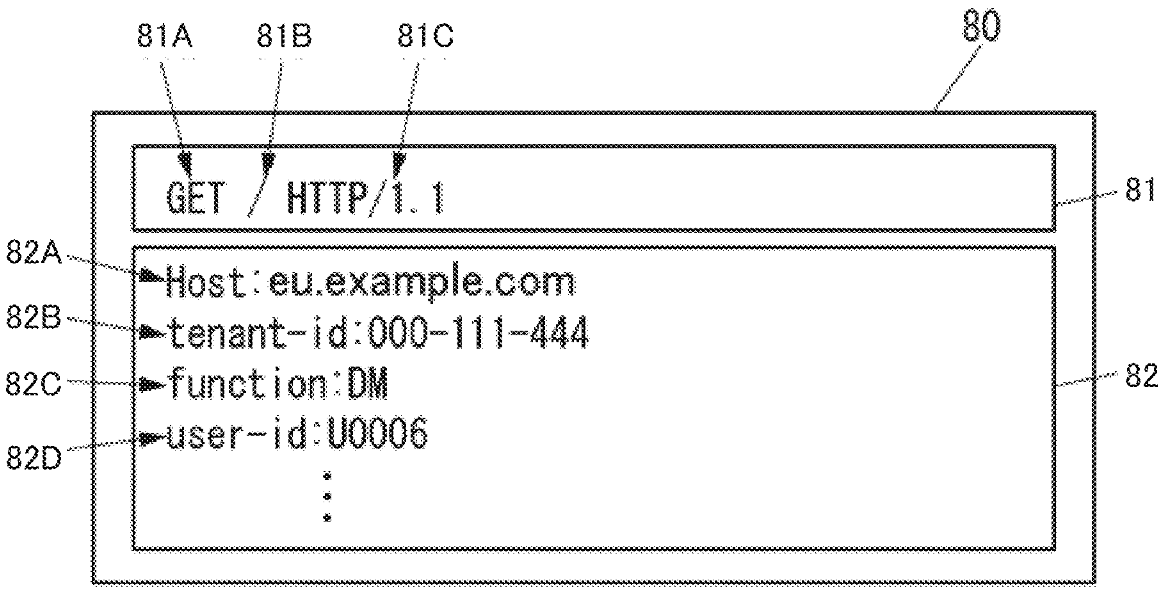
FIG. 20B is a schematic drawing showing another example of the HTTP request, transmitted to the image processing system cluster.

FIG. 20A illustrates an example of the HTTP request 80 of the connection request, transmitted to the preliminary URL, different from the ones shown in FIG. 16B and FIG. 19A. FIG. 20B illustrates an example of the HTTP request 80, forwarded by the connection request forwarding device 35A that has received the HTTP request 80 shown in FIG. 20A, to the image processing system cluster 20.

When the connection request forwarding device 35A receives the HTTP request 80 shown in FIG. 20A, from the forwarding source having the IP address "192.0.2.60", with the forwarding rule 43 being specified as shown in FIG. 17, the forwarding condition corresponding to the ID "001" is satisfied, at least on the basis of the path included in the request line 81 of the HTTP request 80 (YES at step S308), the prohibition condition is not satisfied (NO at step S309), and the instruction to edit the path is associated with the forwarding condition corresponding to the ID "001" in the forwarding rule 43 (YES at step S310). Therefore, the connection request forwarding device 35A deletes "/eu" from the path included in the target 81B of the request line 81 of the HTTP request 80 as shown in FIG. 20B (step S311), and rewrites the Host header 82A of the HTTP request 80 from "Host: example.net" (see FIG. 20A) to "Host: eu.example.com" (see FIG. 20B), indicating the domain name of the forwarding destination associated with the forwarding condition corresponding to the ID "001", and then forwards the HTTP request 80 shown in FIG. 20B (step S313)

Figure 21A:
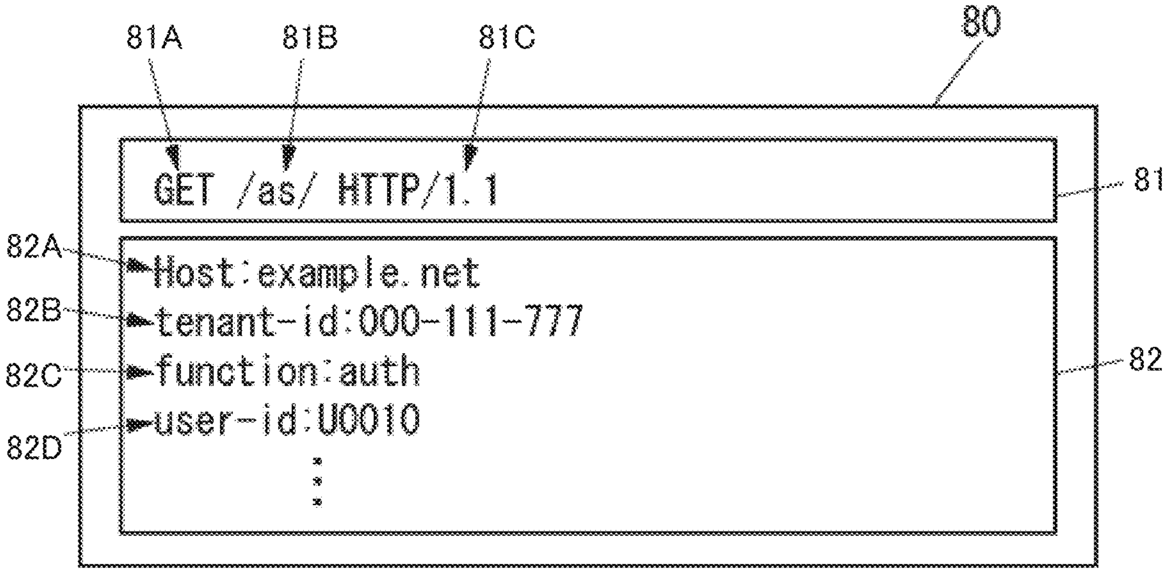
FIG. 21A is a schematic drawing showing another example of the HTTP request of the connection request, transmitted to the preliminary URL.
Figure 21B:
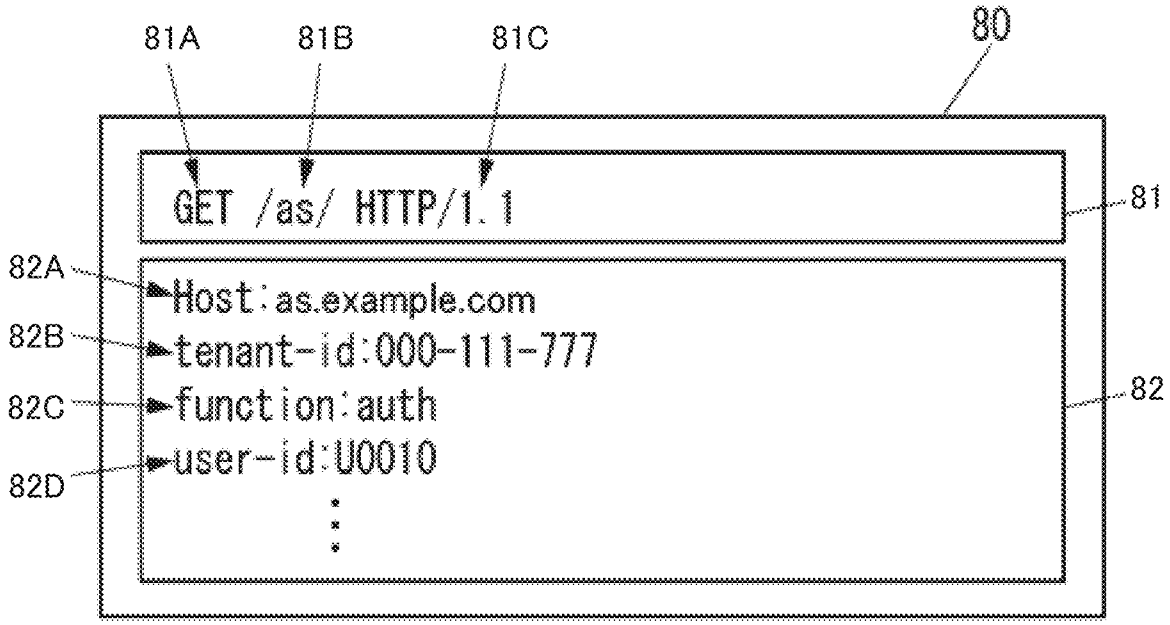
FIG. 21B is a schematic drawing showing another example of the HTTP request, transmitted to the image processing system cluster.

FIG. 21A illustrates an example of the HTTP request 80 of the connection request, transmitted to the preliminary URL, different from the ones shown in FIG. 16B, FIG. 19A, and FIG. 20A. FIG. 21B illustrates an example of the HTTP request 80, forwarded by the connection request forwarding device 35A that has received the HTTP request 80 shown in FIG. 21A, to the image processing system cluster 20.

When the connection request forwarding device 35A receives the HTTP request 80 shown in FIG. 21A from the forwarding source having the IP address "192.0.2.40", with the forwarding rule 43 being specified as shown in FIG. 17, the forwarding condition corresponding to the ID "004" is satisfied, at least on the basis of the value of the function header 82C in the header field 82 of the HTTP request 80 (YES at step S308), but the prohibition condition is also satisfied, on the basis of the IP address of the forwarding source (YES at step S309). Therefore, the HTTP request 80 is kept from being forwarded to the forwarding destination associated with the forwarding condition corresponding to the ID "004".

The forwarding condition corresponding to the ID "005" is satisfied (YES at step S308), the prohibition condition is not satisfied (NO at step S309), and the instruction to edit the path is not associated with the forwarding condition corresponding to the ID "005" in the forwarding rule 43 (NO at step S310). Therefore, connection request forwarding device 35A rewrites the Host header 82A of the HTTP request 80 from "Host: example.net" (see FIG. 21A) to "Host: as.example.com" (see FIG. 21B), indicating the domain name of the forwarding destination associated with the forwarding condition corresponding to the ID "005", and forwards the HTTP request 80 shown in FIG. 21B (step S313)

As described above, according to the third embodiment, when the forwarding condition is satisfied at least on the basis of the HTTP request 80 of the connection request from the connection source (YES at step S308), and the prohibition condition is not satisfied (NO at step S309), the gateway 30 forwards the connection request, to the information processing system cluster 20 corresponding to the forwarding destination associated with the forwarding condition (step S312 and step S313). Although the forwarding condition is satisfied at least on the basis of the HTTP request 80 (YES at step S308), the gateway 30 does not forward the connection request, when the prohibition condition is satisfied (YES at step S309). Therefore, the connection request from the connection source can be forwarded to the appropriate one of the plurality of image processing system clusters 20, according to the detail of the connection request.

According to the third embodiment, the prohibition condition includes a condition that the IP address of the connection source is a specific IP address (prohibition condition associated with the forwarding condition corresponding to the ID "001", "002", or "004" in the forwarding rule 43). Therefore, even though the forwarding condition is satisfied at least on the basis of the HTTP request 80, the gateway 30 does not forward the connection request from a specific IP address. As result, the connection request from the connection source can be forwarded to the appropriate image processing system clusters 20, with a simple configuration. Since the gateway 30 does not forward the connection request from a specific IP address, the connection request from the region corresponding to the specific IP address can be prevented from being forwarded.

According to the third embodiment, the prohibition condition includes a condition that the HTTP request 80 includes a specific character string indicating a specific tenant using the image processing system cluster 20 (prohibition condition associated with the forwarding condition corresponding to the ID "001" or "004" in the forwarding rule 43). Therefore, even though the forwarding condition is satisfied at least on the basis of the HTTP request 80, the gateway 30 does not forward the connection request to a specific tenant. As result, the connection request from the connection source can be forwarded to the appropriate image processing system clusters 20, with a simple configuration.

According to the third embodiment, further, the prohibition condition includes a condition that the HTTP request 80 includes a specific character string indicating a specific user of the image processing system cluster 20 (prohibition condition associated with the forwarding condition corresponding to the ID "002" or "003" in the forwarding rule 43). Therefore, even though the forwarding condition is satisfied at least on the basis of the HTTP request 80, the gateway 30 does not forward the connection request from a specific user. As result, the connection request from the connection source can be forwarded to the appropriate image processing system clusters 20, with a simple configuration.

The forwarding rule 43 includes, among the region, the tenant ID, and the function, the forwarding condition only related to the region (forwarding condition corresponding to the ID "001" or "002"), the forwarding condition only related to the tenant ID (forwarding condition corresponding to the ID "003"), and the forwarding condition only related to the function (forwarding condition corresponding to the ID "004"). Instead, the forwarding rule 43 may include at least one of the forwarding condition related to all of the region, the tenant ID, and the function, the forwarding condition only related to the region and the tenant ID, the forwarding condition only related to the region and the function, and the forwarding condition only related to the tenant ID and the function.

For example, the forwarding conditions only related to the region and the function can be exemplified by a condition that "the path included in the request line 81 of the HTTP request 80 includes a character string indicating a specific region", or that "the value of the specific header in the header field 82 of the HTTP request 80 includes a character string indicating a specific function of the image processing system cluster 20", or a condition that "the path included in the request line 81 of the HTTP request 80 includes a character string indicating a specific region, and the value of the specific header in the header field 82 of the HTTP request 80 includes a character string indicating a specific function of the image processing system cluster 20".

The forwarding rule 43 may be specified such that the forwarding condition related to both of the tenant ID and the function is applied with the highest priority, among the forwarding condition related to both of the tenant ID and the function, the forwarding condition only related to the tenant ID, and the forwarding condition only related to the function. Likewise, the forwarding rule 43 may be specified such that the forwarding condition only related to the tenant ID is applied with higher priority, among the forwarding condition only related to the function and the forwarding condition only related to the tenant ID.

The description thus far given refers to the case where the header field 82 includes the tenant-id header 82B and the function header 82C. However, at least one of the tenant-id header 82B and the function header 82C may be excluded from the header field 82. For example, when the header field 82 does not include the tenant-id header 82B, the preliminary URL and the HTTP request 80 may be formed as shown in FIG. 22A and FIG. 22B.

Figure 22A:
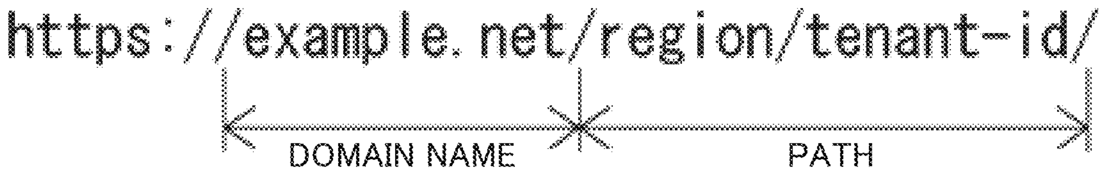
FIG. 22A is a schematic drawing showing another example of the preliminary URL.

FIG. 22A illustrates an example of the preliminary URL, different from the one shown in FIG. 16A. FIG. 22B illustrates an example of the HTTP request 80, different from the one shown in FIG. 16B.

In "https://example.net/region/tenant-id/", which is the preliminary URL shown in FIG. 22A, actually a specific character string indicating the tenant ID, such as "000-111-333", is written in the section of "tenant-id". The header field 82 of the HTTP request 80 shown in FIG. 22B does not include the tenant-id header 82B (see FIG. 16A and FIG. 16B).

Figure 22B:
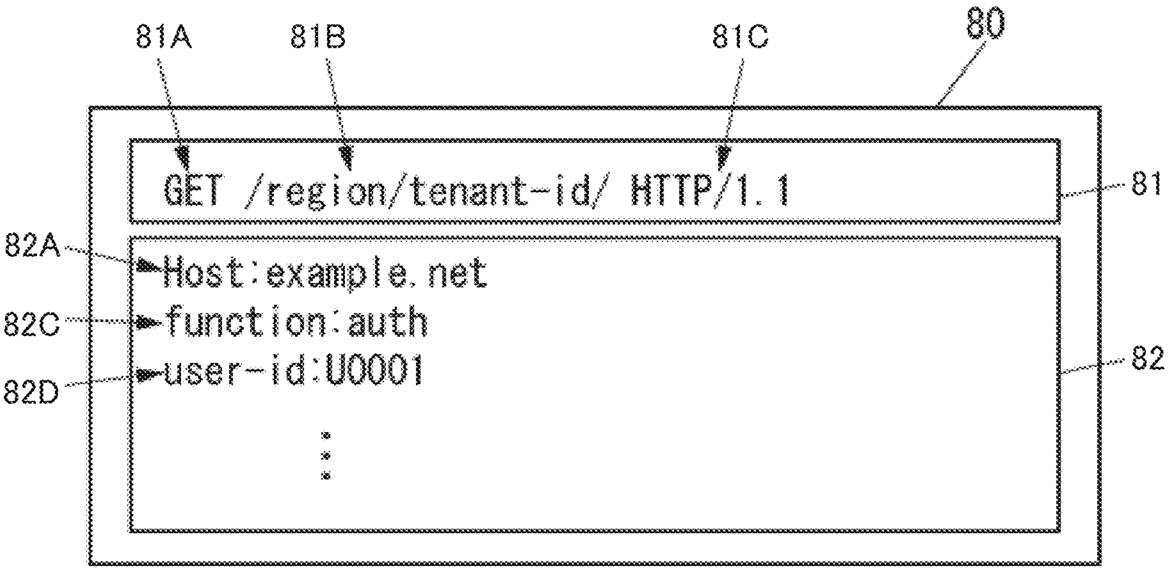
FIG. 22B is a schematic drawing showing another example of the HTTP request of the connection request, transmitted to the preliminary URL.

When the preliminary URL and the HTTP request 80 are formed as shown in FIG. 22A and FIG. 22B, the forwarding rule 43 may be specified as shown in FIG. 23. FIG. 23 is a table showing an example of the forwarding rule 43, different from the one shown in FIG. 17.

The forwarding condition corresponding to the ID "003" in the forwarding rule 43 shown in FIG. 23, is a condition that the path included in the request line 81 of the HTTP request 80 includes the character string "/000-111-333/".

When operating according to the forwarding rule 43 shown in FIG. 23, the connection request forwarding device 35A uses the tenant ID included in the path in the request line 81 of the HTTP request 80, at step S309.

In the third embodiment, the condition related to the value of the tenant-id header 82B in the header field 82 of the HTTP request 80, and the condition related to the value of the function header 82C have been presented, as the forwarding condition. However, the forwarding condition may include a condition related to the value of a specific header in the header field 82 of the HTTP request 80, different from either of the tenant-id header 82B and the function header 82C.

According to the third embodiment, the prohibition condition includes the condition related to the character string indicating the tenant ID in the path included in the request line 81 of the HTTP request 80, the condition related to the value of the tenant-id header 82B in the header field 82 of the HTTP request 80, and the condition related to the value of the user-id header 82D in the header field 82 of the HTTP request 80. However, the prohibition condition may also include a condition related to a specific character string indicating a subject other than the tenant ID, in the path included in the request line 81 of the HTTP request 80, or a condition related to a value of a specific header, different from either of the tenant-id header 82B and the user-id header 82D.

In the first to third embodiments, the image processing system cluster 20 may act in the multitenant model. Instead, the image processing system cluster 20 may act in a single-tenant model, to be utilized by a single tenant.

In the first to third embodiments, the information processing system according to the disclosure is exemplified by the image processing system cluster 20. However, the information processing system according to the disclosure may be a system other than the image processing system.

While the present disclosure has been described in detail with reference to the embodiments thereof, it would be apparent to those skilled in the art the various changes and modifications may be made therein within the scope defined by the appended claims.

What is claimed is:

1. A connection request forwarding system comprising:

a communication interface that performs communication between a connection source and a plurality of information processing systems;

a control device including a processor and a memory, and configured to act, when the processor executes a connection request forwarding program stored in the memory, as a connection request forwarding device that receives, via the communication interface, a connection request transmitted from the connection source, and forwards the connection request to one of the plurality of information processing systems; and a database that stores a plurality of forwarding conditions, each forwarding condition indicating an association between (i) at least one of a region identifier indicating an information processing system located in a specific region, a tenant identifier indicating an information processing system for a specific tenant, and a function identifier indicating an information processing system for performing a specific function, (ii) a forwarding destination of the connection request, and (iii) a priority, wherein the processor:

sequentially determines, in descending order of priority, whether each of the plurality of forwarding conditions is satisfied based at least on one of the region identifier, the tenant identifier, and the function identifier included in an HTTP request of the connection request;

determines as a forwarding destination of the connection request, an information processing system associated with a forwarding condition that is first determined to be satisfied; and forwards, via the communication interface, the connection request to the determined forwarding destination.

2. The connection request forwarding system according to claim 1, wherein the processor forwards the connection request, when determining that the forwarding condition is satisfied on a basis of a path included in a request line of the HTTP request.

3. The connection request forwarding system according to claim 1, wherein, when the forwarding condition is satisfied, and an instruction to edit the path is associated with the forwarding condition, the processor edits the path according to the instruction.

4. The connection request forwarding system according to claim 1, wherein the processor forwards the connection request, when determining that the forwarding condition is satisfied on a basis of a value of a specific header in a header field of the HTTP request.

5. The connection request forwarding system according to claim 1, wherein the processor is configured to:

forward the connection request, when the forwarding condition is satisfied but a prohibition condition on the connection request forwarding is not satisfied; and keep from forwarding the connection request when the prohibition condition is satisfied, although the forwarding condition is satisfied.

6. The connection request forwarding system according to claim 5, wherein the processor decides that the prohibition condition is satisfied, when an IP address of the connection source is a specific IP address.

7. The connection request forwarding system according to claim 5, wherein the processor decides that the prohibition condition is satisfied, when the HTTP request includes a specific-third character string.

8. The connection request forwarding system according to claim 7, wherein the character string indicates a specific tenant using the information processing system.

9. The connection request forwarding system according to claim 7, wherein the character string indicates a specific user using the information processing system.

10. The connection request forwarding system according to claim 1, wherein, when the forwarding condition is not satisfied, the processor transmits an error message to the connection source, instead of forwarding the connection request.

11. A computer-readable, non-transitory recording medium having a connection request forwarding program stored therein, the connection request forwarding program being configured to cause a computer, the computer including a communication interface that performs communication between a connection source and a plurality of information processing systems; a database that stores a plurality of forwarding conditions, each forwarding condition indicating an association between (i) at least one of a region identifier indicating an information processing system located in a specific region, a tenant identifier indicating an information processing system for a specific tenant, and a function identifier indicating an information processing system for performing a specific function, (ii) a forwarding destination of the connection request, and (iii) a priority; and a processor, to act, when the processor executes a connection request forwarding program, as a connection request forwarding device that receives, via the communication interface, a connection request transmitted from the connection source, and forwards the connection request to one of a plurality of information processing systems, wherein the processor:

sequentially determines, in descending order of priority, whether each of the plurality of forwarding conditions is satisfied based at least on one of the region identifier, the tenant identifier, and the function identifier included in an HTTP request of the connection request;

determines as a forwarding destination of the connection request, an information processing system associated with a forwarding condition that is first determined to be satisfied; and forwards, via the communication interface, the connection request to the determined forwarding destination.

* * * * *